(12) United States Patent
Wang et al.

(10) Patent No.: US 10,795,151 B2
(45) Date of Patent: Oct. 6, 2020

(54) METHODS AND SYSTEMS FOR TERAHERTZ-BASED POSITIONING

(71) Applicant: Mitsubishi Electric Research Laboratories, Inc., Cambridge, MA (US)

(72) Inventors: Pu Wang, Cambridge, MA (US); Haoyu Fu, Columbus, OH (US); Philip Orlik, Cambridge, MA (US); Toshiaki Koike-Akino, Belmont, MA (US); Rui Ma, Lexington, MA (US); Bingnan Wang, Belmont, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 231 days.

(21) Appl. No.: 15/951,430

(22) Filed: Apr. 12, 2018

(65) Prior Publication Data
US 2019/0317315 A1   Oct. 17, 2019

(51) Int. Cl.
  *G02B 26/08*   (2006.01)
  *G02B 26/10*   (2006.01)
  (Continued)

(52) U.S. Cl.
  CPC ........ *G02B 26/101* (2013.01); *G01B 11/2518* (2013.01); *G01N 21/3586* (2013.01)

(58) Field of Classification Search
  CPC ............. G02B 26/101; G01N 21/3586; G01D 5/34746; G01D 5/34792; G01D 5/48; G01B 11/2518
  See application file for complete search history.

(56) References Cited

U.S. PATENT DOCUMENTS

| 2011/0168891 A1* | 7/2011 | van der Weide ......... G01J 3/02 250/334 |
| 2014/0048710 A1* | 2/2014 | Xu ..................... H01Q 15/0053 250/341.1 |

(Continued)

FOREIGN PATENT DOCUMENTS

| DE | 2741058 A2 | 6/2014 |
| EP | 2653838 A2 | 10/2013 |
| JP | S5759313 U | 4/1982 |

OTHER PUBLICATIONS

Wang et al., "Metamaterial Absorber for THz Polarimetric Sensing," Proceedings of SPIE; ISSN 0277-786X vol. 10524, vol. 10531, Feb. 23, 2018. pp. 105311D.

*Primary Examiner* — Euncha P Cherry
(74) *Attorney, Agent, or Firm* — Gennadiy Vinokur; James McAleenan; Hironori Tsukamoto

(57) ABSTRACT

An encoder of a terahertz (THz)-based absolute positioning system used for decoding patterns from THz-band measurements. The encoder includes a scale with a multi-layer reflective/transmissive structure having a matrix with rows. Each row of the matrix corresponds to a plurality of patterns, such that each pattern is used to form a measurement. An emitter emits a THz waveform to the scale. A receiver is used to measure amplitudes of the THz waveform reflected from the scale. A memory stores data including predetermined positions of the emitter based on the patterns of the layers from the scale. Wherein one or more processors can determine a position of the emitter from the measurements of the amplitudes received by the receiver, based on the stored data. An output interface can be used to render the position of the emitter.

19 Claims, 24 Drawing Sheets

(51) Int. Cl.
*G01B 11/25* (2006.01)
*G01N 21/3586* (2014.01)

(56) References Cited

U.S. PATENT DOCUMENTS

2015/0008326 A1\* 1/2015 Kubota ................ G01N 29/069
250/341.1
2017/0082463 A1 3/2017 Noguchi et al.

\* cited by examiner (THz Raster Scanning (single transceiver) for (Multi-Layer, Multi-Track, Multi-Level) Absolute Positioning Systems)

(THz Line Scanning (transceiver array) for (Multi-Layer, Multi-Track, Multi-Level) Absolute Positioning Systems)

(THz Compressive Scanning (single THz transceiver + lens) for (Multi-Layer, Multi-Track, Multi-Level) Absolute Positioning Systems)

(Absolute Positioning Systems for Elevators)

| 931 | 932 |
|---|---|
| 00011011 | Position 1 |
| 00011010 | Position 2 |
| 00011001 | Position 3 |
| 00011000 | Position 4 |
| 00011111 | Position 5 |
| 10010011 | Position 6 |
| 10010011 | Position 7 |

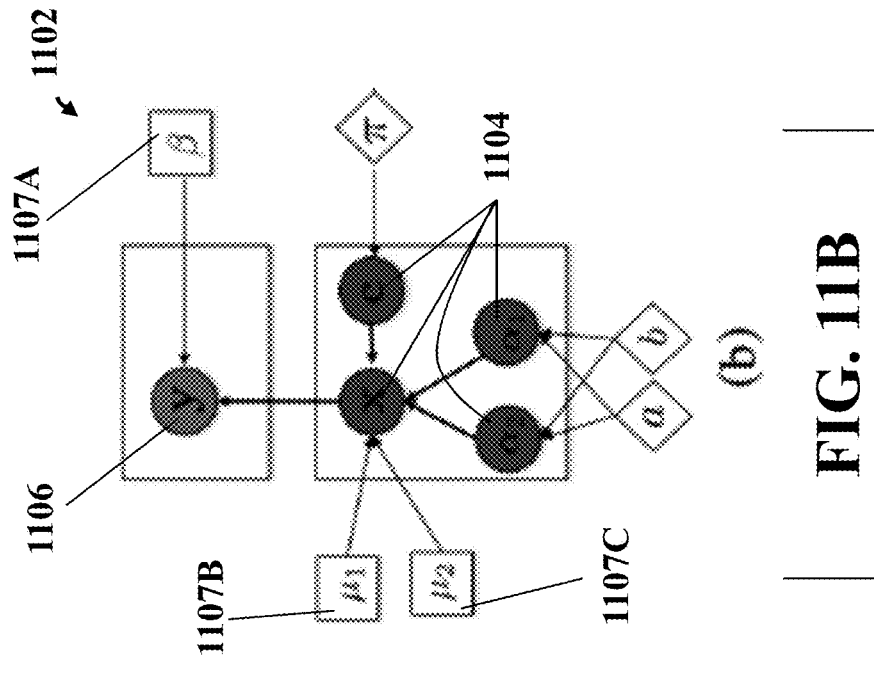
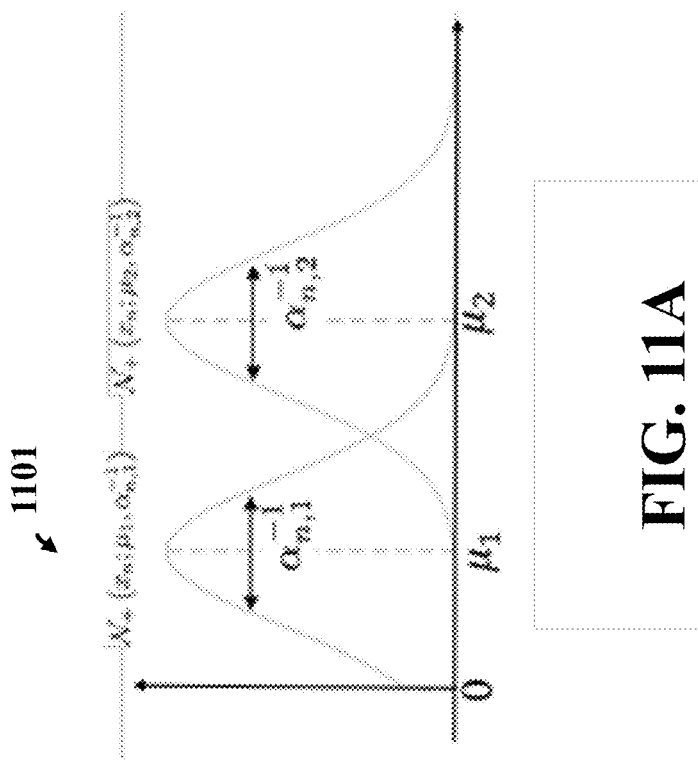
FIG. 11A
FIG. 11B

*(Computer Device)*

*(Mobile Computer Device)*

METHODS AND SYSTEMS FOR TERAHERTZ-BASED POSITIONING

FIELD

The present disclosure relates generally to terahertz-based (absolute) positioning systems, and more particularly to decoding pseudo-random patterns from THz-band (transmission or reflection) measurements.

BACKGROUND

Conventional terahertz (THz) sensing has been applied for gas sensing, moisture analysis, package inspection, biomedical diagnosis, and security screening.

In a raster scanning mode, a sample under inspection is illuminated by a THz point source with a time-compact source pulse and a small spot size (or aperture). The THz emitter sends a focused beam at a normal incident angle to inspect a small area (or a pixel) of the sample, the detector then samples corresponding reflected waveform via the electro-optic sampling process, and a programmable mechanical raster moves the sample in the plane perpendicular to the incidental waveform in order to measure the two-dimensional surface of the sample. The THz with the raster scanning mode is used in commercial applications with a fast scanning rate (up to 1,000 Hz). However, some key challenges is how to address the depth variations and the raster scanning induced delay/phase variation from one pixel to another, due to either the irregular sample surface, or vibration from a mechanical raster scanning process. Consequently, the depth variation (e.g., at the millimeter level) changes the reflection path lengths to the detector from one pixel to another. For the THz wave with a wavelength less than 1 mm, such depth variation results in phase distortions and causes sweep distortions in the reflected waveform, which limits the use to only a few specific applications.

Accordingly, there is need for developing a THz sensing system that can read pseudo-random reflectance patterns using THz waves that can operate within extreme harsh environments, including operating scenarios with capabilities of penetrating environments having dust, fire and vibration, among other aspects.

SUMMARY

The present disclosure relates to providing systems and methods to terahertz-based absolute positioning systems, and more particularly to decoding pseudo-random patterns from THz-band measurements.

Some embodiments of the present disclosure are able to read pseudo-random transmission/reflectance patterns using THz waves while operating within harsh environments, including having the capability of penetrating dust, fire, wide bandwidth and vibration.

Some embodiments of the present disclosure are related to using THz transceivers to illuminate a scale covered by multiple layers of materials which can be penetrated by THz wave with each layer marked by a pseudo-random pattern for absolute positioning.

During experimentation, several methods were tested, one particular approach included using a raster scanning approach across multiple tracks for a given position. However, we learned that the raster scanning approach can be successful, if certain variables are below each of their specific predetermined threshold. For example, some specific variables can include motion (i.e. which needs to be below a motion threshold), vibration (i.e. needs to be below a vibration threshold), scanning time of THz sensor over a certain area (i.e. the scan time needs to be below a threshold). Otherwise, if anyone variable is not below their individual specific predetermined threshold, then more likely the quality and operation of the raster scanning method, among other things, will mostly likely correspondingly decrease. Some reasons the raster scanning approach can be effected by these certain variables can include, among other things, a lack or disregard of maintenance to mechanical movable parts, which can result in vibration to the raster scanning. For example, a raster scanning approach exposed to amounts of vibration can result in an operation failure of positioning systems, such as extremely high-speed absolute positioning systems, e.g., high-speed elevators.

The second approach tested during experimentation included using multiple THz transceivers or an array of THz transceivers in one or two-dimensional domains, wherein each THz transceiver is aligned to a specific track. An aspect of this second approach included concerns, such as costs and compactness of the hardware components, which depending upon a user's resources, could limit or prohibit deployment of a multiple THz receiver approach for some commercial applications.

According to some embodiments of the present disclosure, an approach learned from experimentation includes using a compressed scanning scheme to decode multi-track pseudo-random transmission/reflectance patterns. At least one discovered advantage to this approach, among many discovered advantages, is that this compressed scanning scheme completely removes the problems mentioned above regarding for example the mechanical raster scanning steps. In particular, the compressed scanning scheme does not have a heavy maintenance burden of mechanical movable parts, is capable of operating with effects of vibration, and can operate at extremely high-speed absolute positioning systems, including high-speed elevators, by non-limiting example.

Another advantage to the compressed scanning scheme, of the many advantages, is that there is only one THz transceiver which reduces hardware cost and compactness of hardware components, and thus, overcomes our second approach concerns, noted earlier. Through experimentation with the compressed scanning scheme for THz-based absolute positioning systems, several algorithms to decode pseudo-random patterns from the THz-band measurements were created, and later found to be successful. Noted from experimentation is that compressed scanning scheme can be used in industrial applications using the THz wave with a frequency range, by non-limiting example, from 0.3 to 3 terahertz (1 THz=$10^{12}$ Hz), and corresponding wavelengths by non-limiting example, from 1 mm to 0.1 mm (or 100 μm). Specific applications can include positioning at elevator and train systems, content extraction from scanned layered samples, non-destructive evaluation, composite material inspection, and explosives or drugs identification.

Another application of the pseudo-random decoding algorithm can be symbol detection for wireless communications when the transmitted symbol is subject to transmitting errors due to hardware impairments. The pseudo-random decoding algorithm maybe preferred in the massive multiple-input multiple-output (MIMO) systems where a large number of transmitting antennas is used.

According to an embodiment of the present disclosure, an encoder including a scale with a multi-layer reflective/transmissive structure. Wherein each layer includes a matrix having rows, such that each row of the matrix corresponds to a pattern used to form a measurement. An emitter to emit a terahertz (THz) waveform to the scale while in relative motion with the scale. A receiver to measure amplitudes of the THz waveform reflected from or passing through the scale. A computer hardware memory to store data including patterns corresponding to predetermined positions of the emitter or a set of training amplitudes of reflected/transmitted THz waveforms, based on patterns of the layers from the scale. A processor to determine a position of the emitter from the measurements of the amplitudes received by the receiver based on the stored data. An output interface to render the position of the emitter.

According to another embodiment of the present disclosure, an encoder including a scale with at least one layer reflective/transmissive structure, wherein the at least one layer includes a matrix having rows. Such that each row of the matrix corresponds to a pattern used to form a measurement. An emitter to emit a terahertz (THz) waveform to the scale while in relative motion with the scale. A receiver to measure amplitudes of the THz waveform reflected from or passing through some rows of the at least one layer of the scale. A computer hardware memory to store data including patterns corresponding to predetermined positions of the emitter or a set of training amplitudes of reflected THz waveforms, based on patterns of the at least one layer from the scale. A processor to determine a position of the emitter from the measurements of the amplitudes received by the receiver, based on the stored data. An output interface to render the position of the emitter.

According to another embodiment of the present disclosure, an absolute positioning encoder method for an encoder. The method includes the steps of emitting by an emitter of the encoder, a Terahertz (THz) waveform while in relative motion with the scale, to a scale with a multi-layer reflective/transmissive structure. Wherein each layer of the multi-layer reflective/transmissive structure includes a matrix having rows, such that each row of the matrix corresponds to a pattern used to form a measurement. Measuring by a receiver of the encoder, amplitudes of the THz waveform reflected from some rows of each layer of the scale. Retrieving from a computer hardware memory of the encoder, stored data including patterns corresponding to predetermined positions of the emitter or a set of training amplitudes of THz waveforms, based on patterns on the multi-layer reflective/transmissive structure of the scale. Determining by a processor of the encoder, a position of the emitter from the measurements of the amplitudes received by the receiver, based on the stored data. Rendering the position of the emitter to an output interface.

According to another embodiment of the present disclosure, an absolute positioning encoder system including an encoder, the encoder having a scale with at least one reflective/transmissive structure including a matrix having rows. Wherein the at least one layer includes a matrix having rows, such that each row of the matrix corresponds to a pattern used to form a measurement. The system includes an emitter of the encoder that emits a terahertz (THz) waveform to the scale while in relative motion with the scale. A receiver of the encoder measures amplitudes of the THz waveform reflected from, or passing through, some rows of the at least one layer of the scale. A computer hardware memory of the encoder to store data including patterns corresponding to predetermined positions of the emitter or a set of training amplitudes of reflected THz waveforms, based on patterns of the layers from the scale. A processor of the encoder to determine a position of the emitter from the measurements of the amplitudes based on the data. An output interface to render the position of the emitter.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 9 is a schematic illustrating a lookup table providing a mapping between sequences of amplitude values of the reflected wave and the position of the emitter, according to embodiments of the present disclosure;

FIG. 11A is a graph illustrating a truncated Gaussian mixture prior distribution for binary coefficients which is to be estimated, according to embodiments of the present disclosure;

FIG. 11B is a schematic illustrating the overall hierarchical signal model including the noise and prior distributions on the unknown coefficients and hyper-prior parameters, according to embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The present disclosure relates to providing devices, systems and methods for a terahertz-based absolute positioning system used for decoding pseudo-random patterns from THz-band measurements, according to embodiments of the present disclosure. The system can include an encoder including a scale with a multi-layer reflective/transmissive structure includes a matrix having rows, wherein each row of the matrix corresponds to a plurality of patterns, such that each pattern is used to form a measurement. An emitter emits a THz waveform to the scale while in relative motion with the scale. A receiver can be used to measure amplitudes of the THz waveform reflected/transmitted from some rows of each layer of the scale. A computer hardware memory can store data including predetermined positions of the emitter with training amplitudes of reflected training THz waveforms, based on the patterns of the layers from the scale. Wherein one or more processor can determine a position of the emitter from the measurements of the amplitudes based on the data. Finally, an output interface can be used to render the position of the emitter.

Figure 1A:
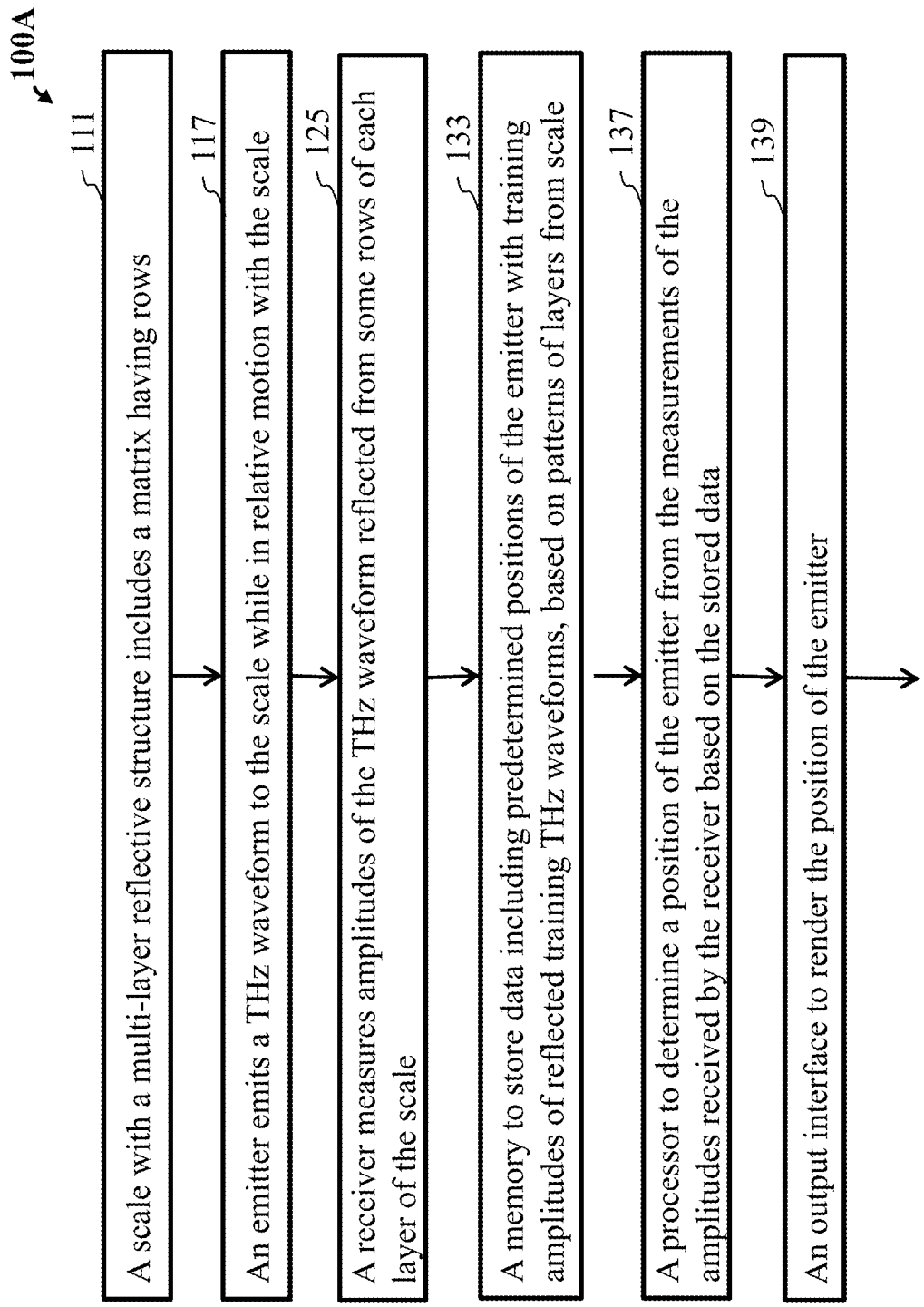
FIG. 1A is a flow diagram illustrating an encoder that emits a waveform to a scale of a terahertz-based absolute positioning system used for decoding pseudo-random code patterns from THz-band measurements, according to embodiments of the present disclosure.

FIG. 1A is a flow diagram illustrating an encoder that emits a waveform to a scale of a terahertz-based absolute positioning system used for decoding pseudo-random code patterns from THz-band measurements, according to embodiments of the present disclosure.

Step 111 of FIG. 1A includes an encoder 100A including a scale with a multi-layer reflective structure includes a matrix having rows, wherein each row of the matrix corresponds to a pattern used to form a measurement.

Step 117 includes the encoder 100A includes an antenna to emit a THz waveform to the scale while in relative motion with the scale.

Step 125 includes the encoder 100A having a receiver to measure amplitudes of the THz waveform reflected from some rows of each layer of the scale.

Step 133 includes the encoder 100A including a computer hardware memory to store data including predetermined positions of the emitter with training amplitudes of reflected training THz waveforms, based on the patterns of the layers from the scale.

Step 137 includes the encoder 100A having a processor to determine a position of the emitter from the measurements of the amplitudes based on the data.

Step 139 includes the encoder 100A including an output interface to render the position of the emitter.

Embodiments of the present disclosure provide unique aspects, by non-limiting example, contactless sensing of pseudo-random patterns can be used in the absolute positioning systems in rough environments such as low light condition, heavy dust, fast positioning time, lower hardware costs, and robust against vibration during earthquake.

Figure 1B:
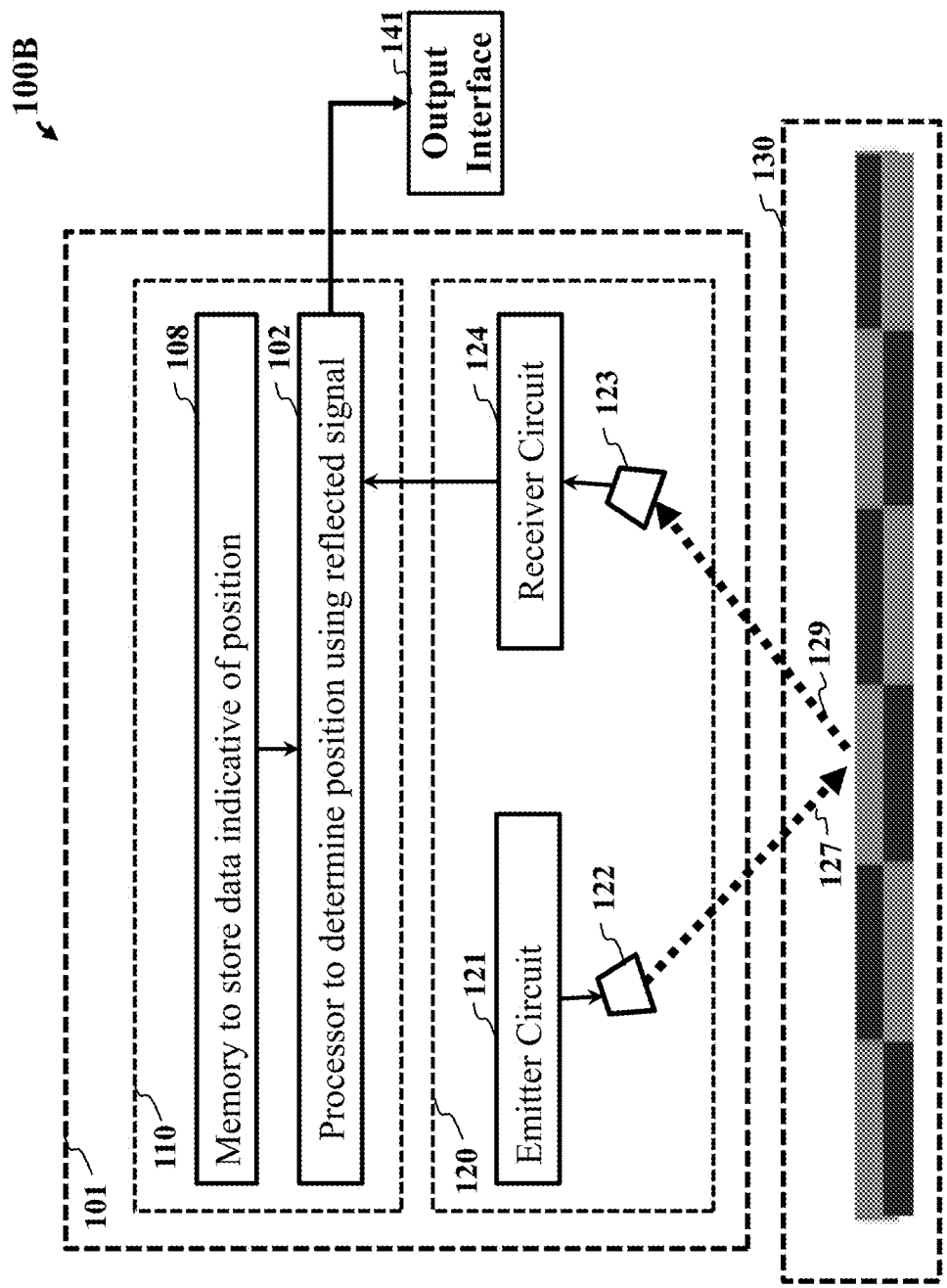
FIG. 1B is a schematic illustrating an encoder, according to embodiments of the present disclosure.

FIG. 1B shows a schematic of an encoder 100B according to some embodiments of the present disclosure. The encoder 100B can be a position encoder that encodes a position, at least in part, in the absorption of a polarized waveform. To that end, the encoder 100B includes a scale 130 to encode the position based on reflection of the incident waveform 129 emitted by an emitter 121 transmitting the waveform 127 via an antenna 122.

The encoder 100B also includes a position information system 110 and a THz waveform system 120, to form at least part of a position detector 101 capable of being in relative motion with the scale 130 during operation. For example, in some embodiments, the scale 130 can be fixed to a fixed body such as a railroad track of a rail system or an elevator wall of an elevator system, by non-limiting example, while the position detector 101 can be fixed to a mobile object such as a train and an elevator car, by non-limiting example. In such a manner, the encoder 100B can be used for detecting the position of the mobile object.

Still referring to FIG. 1B, the THz waveform system 120 can include an emitter 121 to emit a THz waveform to the layered structure of the scale 130. The emitter 121 can generate a waveform and transmit the waveform 127 via free space to the scale 130 from the antenna 122.

The THz waveform system 120 can include a receiver 124 to measure amplitudes of the waveform reflected 129 from the layered structure 130 and collected by an antenna 123 of the receiver 124. The measurements of the reflected waveform 129 are submitted to the position information system 110 to determine the position of the position detector 101 and/or the emitter 121 and to render the position to an output interface 141.

Still referring to FIG. 1B, the position information system 110 can include a memory 108 to store data indicative of positions of the emitter 121, wherein a processor 102 can determine a position of the emitter 121 from the measurements of the amplitudes based on the data indicative of a pattern formed by the scale 130.

Figure 2:
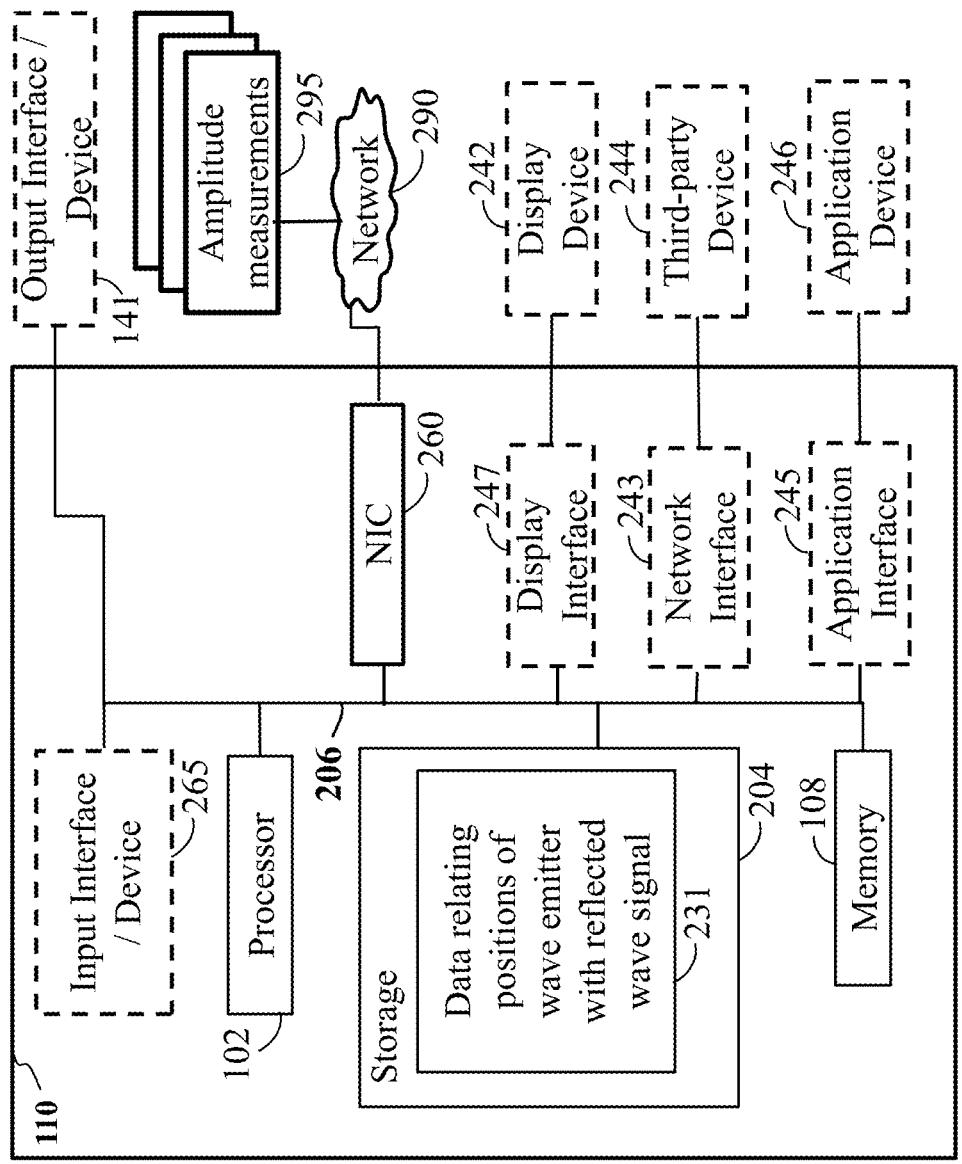
FIG. 2 is a block diagram illustrating a computer-based position information system, according to embodiments of the present disclosure.

FIG. 2 shows a block diagram of a computer-based position information system 110 in accordance with some embodiments of the present disclosure. The position information system 110 can include a processor 102 configured to execute stored instructions, as well as a memory 108 that can store instructions executable by the processor. The processor 102 can be a single core processor, a multi-core processor, a computing cluster, or any number of other configurations. The memory 108 can include random access memory (RAM), read only memory (ROM), flash memory, or any other suitable memory systems. The processor 102 is connected through a bus 206 to one or more input interface/device 265 and output interface/device 141.

These instructions stored in the memory 108 can implement a position estimation of the emitter based on reflection and absorption of the polarized wave emitted by the emitter. Notably, the emitter can be rigidly arranged within the position detector 101, and the position of the emitter can be a direct indication of the position of the position detector 101. In this disclosure, the positions of the emitter the detector are used interchangeably.

Referring to FIG. 2, the position information system 110 of FIG. 1B can also include a storage device 204 and memory 108 of FIG. 1B adapted to store data 231 indicative of positions of the emitter. Specifically, the data 231 can relate positions of the wave emitter with the reflected wave signal 129 of FIG. 1B, based on a pattern formed by the layered structure 130 of FIG. 1B. Examples of the data 231 can include one or combination of the energy levels, track index, and layered index of reflectance coded patterns. Examples of the data 231 can also include a signal model of the reflected signal designed based on the code pattern, and a code including a sequence of bits representing the pattern.

The storage device 204 can be implemented using a hard drive, an optical drive, a thumbdrive, an array of drives, or any combinations thereof. Additionally, or alternatively, the storage device can be implemented as the memory. In some implementations, the memories of the storage device 204 and memory 108 can be merged into one non-transitory computer readable storage medium.

Still referring to FIG. 2, the position information system 110 of FIG. 1B can include an output interface/device 141 to render the estimated position. In some embodiments, the output interface 141 may include a printer interface (not shown) adapted to connect the encoder to a printing device (not shown). In some embodiments, a display interface 247 can be adapted to connect the processor 102 to a display device 248. The display device 247 can include a camera, computer, scanner, mobile device, webcam, or any combination thereof. In some embodiments, a network interface 243 is adapted to connect the processor 102 and also potentially to one or several third party devices 244 on the network 290. In some embodiments, an application interface 245 can be used to submit the estimated position to a position based application devices 246, such as a controller, by non-limiting example, controlling the motion of the mobile object such as the elevator car or the train, by non-limiting example.

The position information system 110 of FIG. 1B can also include an input interface 265 to receive the amplitude measurements 295 of the amplitude of the reflected signal 129. For example, a network interface controller (NIC) 260 can be adapted to connect the position information system 110 of FIG. 1B through the bus 206 to the network 290. The network 290 can be implemented as the wired or wireless network. Through the network 290 and/or other implementations of the input interface 265, the measurements 295 of the amplitude of the reflected signal can be downloaded and stored within the computer's storage system 208 for storage and/or further processing.

Figure 3:
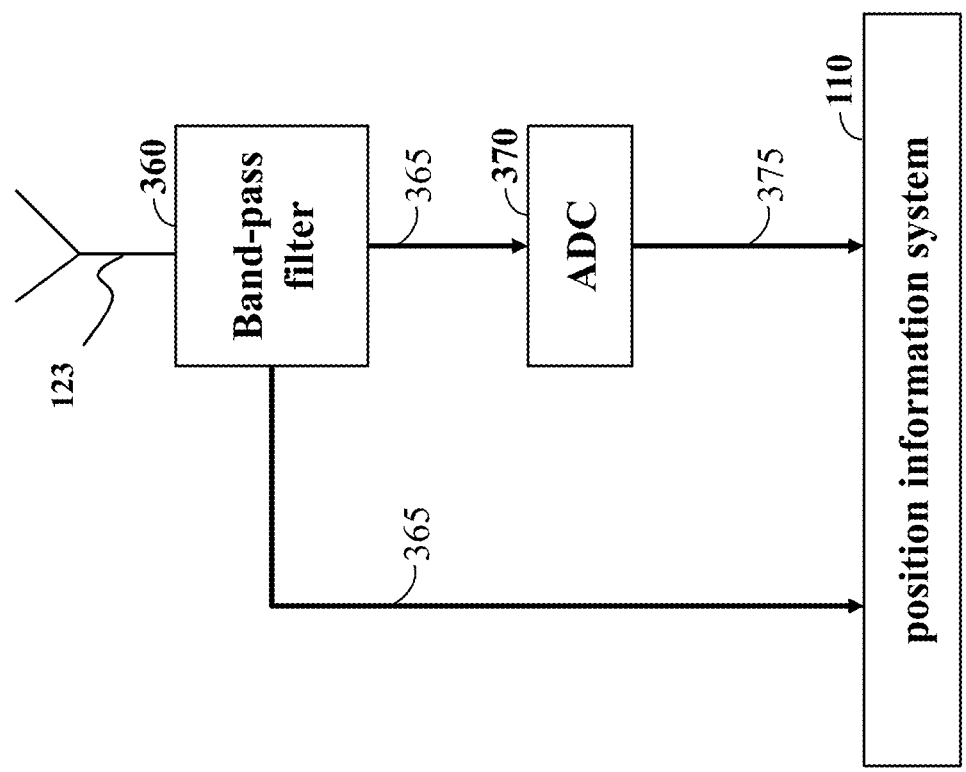
FIG. 3 is a block diagram illustrating a receiver to measure amplitudes of the waveform reflected from the scale, according to embodiments of the present disclosure.

FIG. 3 is a block diagram illustrating a receiver 124 of FIG. 1B to measure amplitudes of the waveform reflected 129 of FIG. 1B from the scale 130 of FIG. 1B, according to embodiments of the present disclosure. The reflected signal 129 of FIG. 1B is received by the antenna 123, and filtered with a filter, i.e. band-pass filter, 360 passing through the frequencies of the THz signal emitted by the emitter 121 of FIG. 1B. The filter analog signal 365 is directly submitted to the position information system 110 of FIG. 1B or optionally converted into a digital representation 375 by an analog-to-digital converter (ADC) 370.

Figure 4:
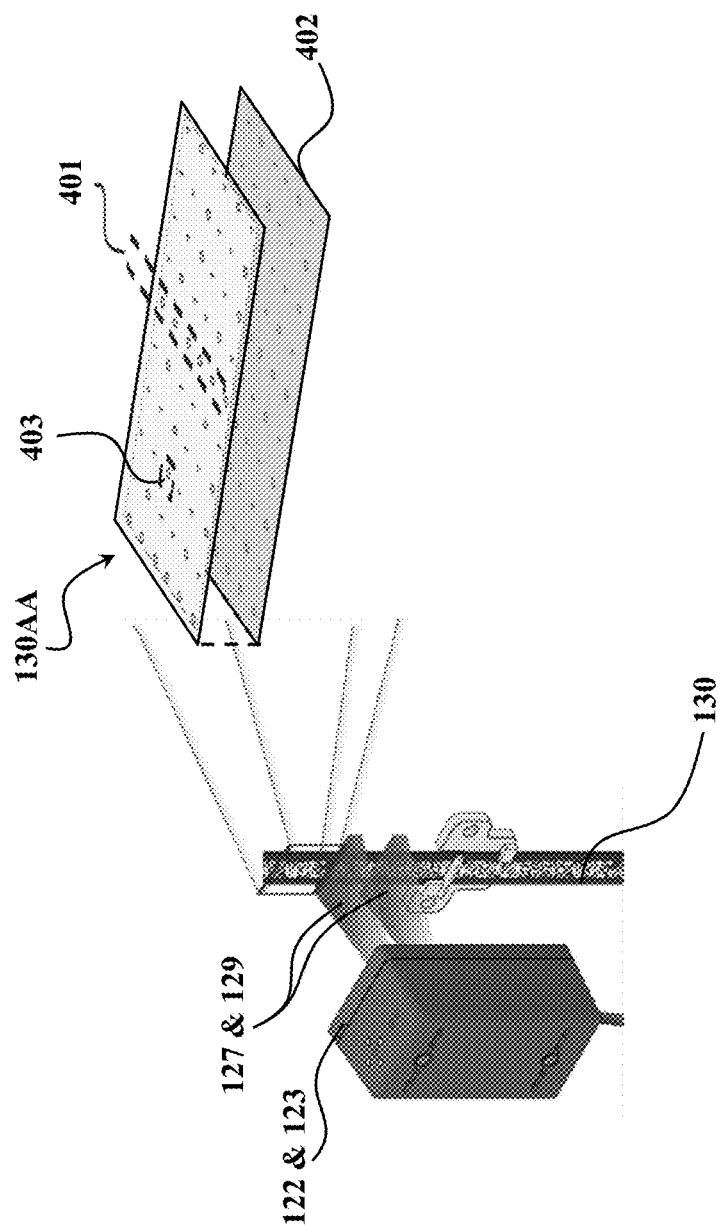
FIG. 4 is a schematic illustrating a multi-layer, multi-track and multi-level encoder system, according to embodiments of the present disclosure.

FIG. 4 is a schematic illustrating a multi-layer, multi-track and multi-level encoder system, according to embodiments of the present disclosure. Wherein the layered structure 130 of FIG. 1B is illustrated as an exploded schematic 130AA, includes multiple tracks 401 of coded patterns and multiple layers 402 of coded patterns. In each track, the number 403 specifies a level of reflectance of the coded pattern in the THz band. For example, 0 means a complete absorption of THz emitted signal, while 1 means a strong reflection of THz emitted signal. The number 403 can be binary or multi-level with a pre-defined mapping between the reflectance and the number. It is noted the THz emitted signal 127 of FIG. 1B is transmitted by an antenna 122 of FIG. 1B of an emitter 121 of FIG. 1B. Wherein the reflected signal 129 of FIG. 1B is received by an antenna 123 of FIG. 1B of a receiver 124 of FIG. 1B.

Figure 5A:
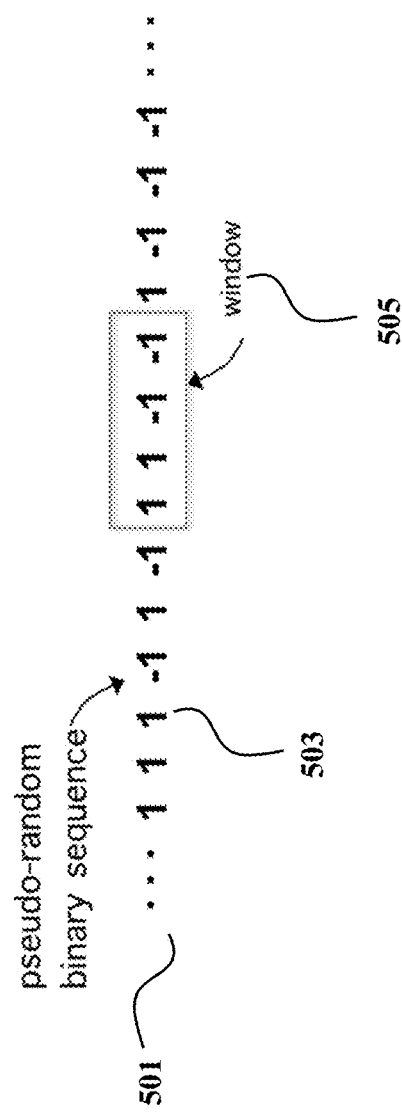
FIG. 5A is a schematic illustrating a single track of binary coded pattern of the scale, according to embodiments of the present disclosure.

FIG. 5A shows a schematic of a single track 501 (for example, track 403 of FIG. 4), of binary coded pattern of the scale 130 (for example, 130AA of FIG. 4), where the number 503 specifies a level of reflectance of the coded pattern in the THz band. The window 505 is the size of binary coded patterns which can be used to uniquely determine the position within the maximum repetitive length. One example of forming the binary coded pattern is the pseudo-random binary sequence or, equivalently, the M-sequence.

Figure 5B:
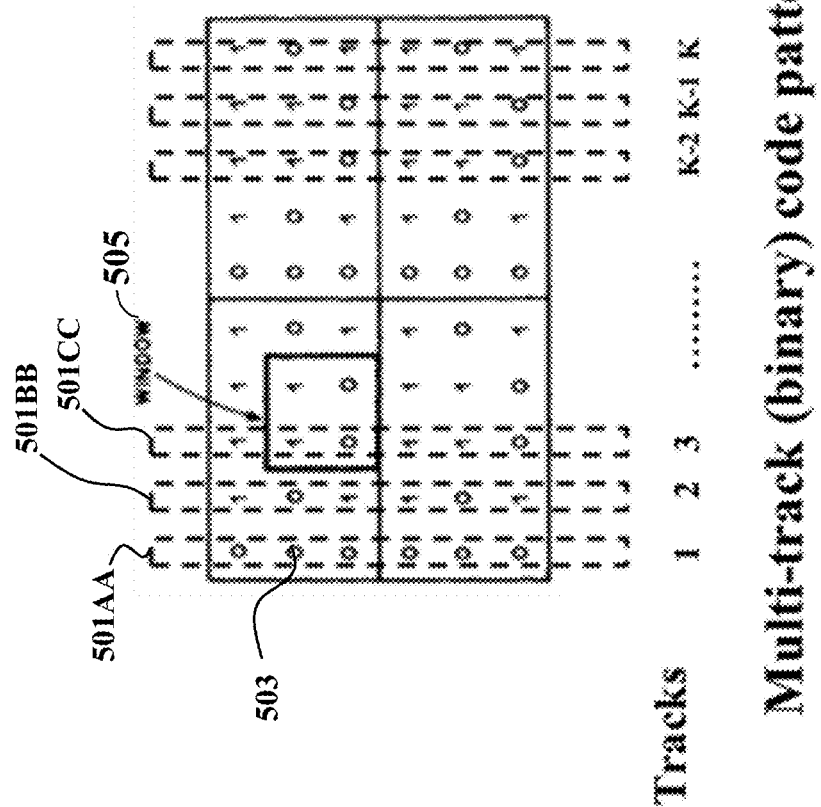
FIG. 5B is a schematic illustrating a multi-track of binary coded pattern of the scale, according to embodiments of the present disclosure.

FIG. 5B shows a schematic of a multi-track 501AA, 501BB, 501CC of binary coded pattern of the scale 130 of FIG. 1B, where the number 503 specifies the level of reflectance of the coded pattern in the THz band. The window 505 is a two-dimensional box including codes from two tracks.

Figure 5C:
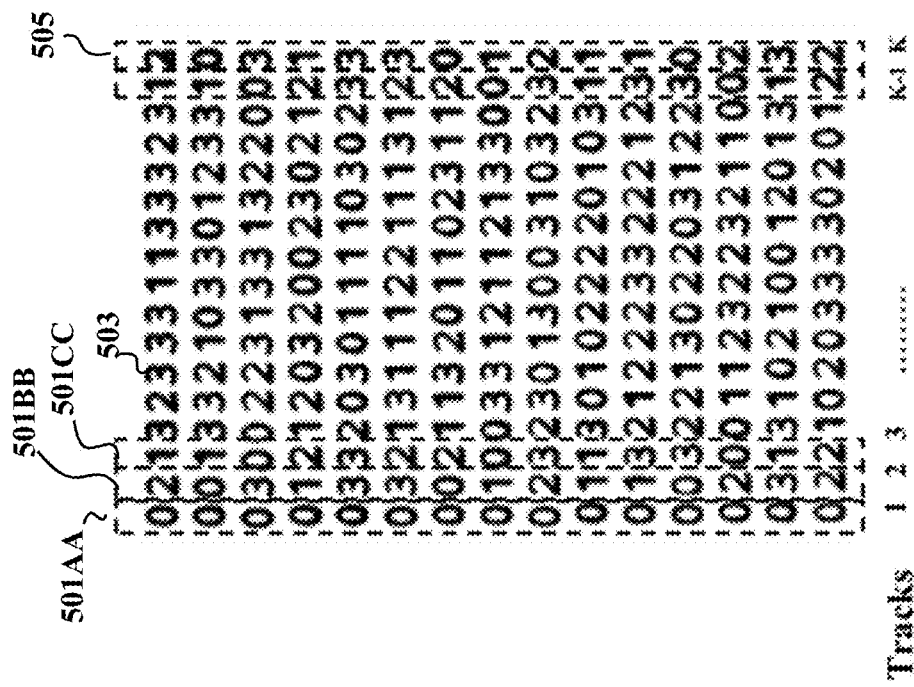
FIG. 5C is a schematic illustrating a multi-track of multi-level coded pattern of the scale, according to embodiments of the present disclosure.

FIG. 5C shows a schematic of a multi-track 501AA, 501BB, 501CC of multi-level coded pattern of the scale 130 of FIG. 1B, where the number 503 specifies the level of reflectance of the coded pattern in the THz band. The number 503 can be multi-level. Further, the window 505 can be a two-dimensional box including codes from two tracks, i.e. K, K−1.

Figure 6A:
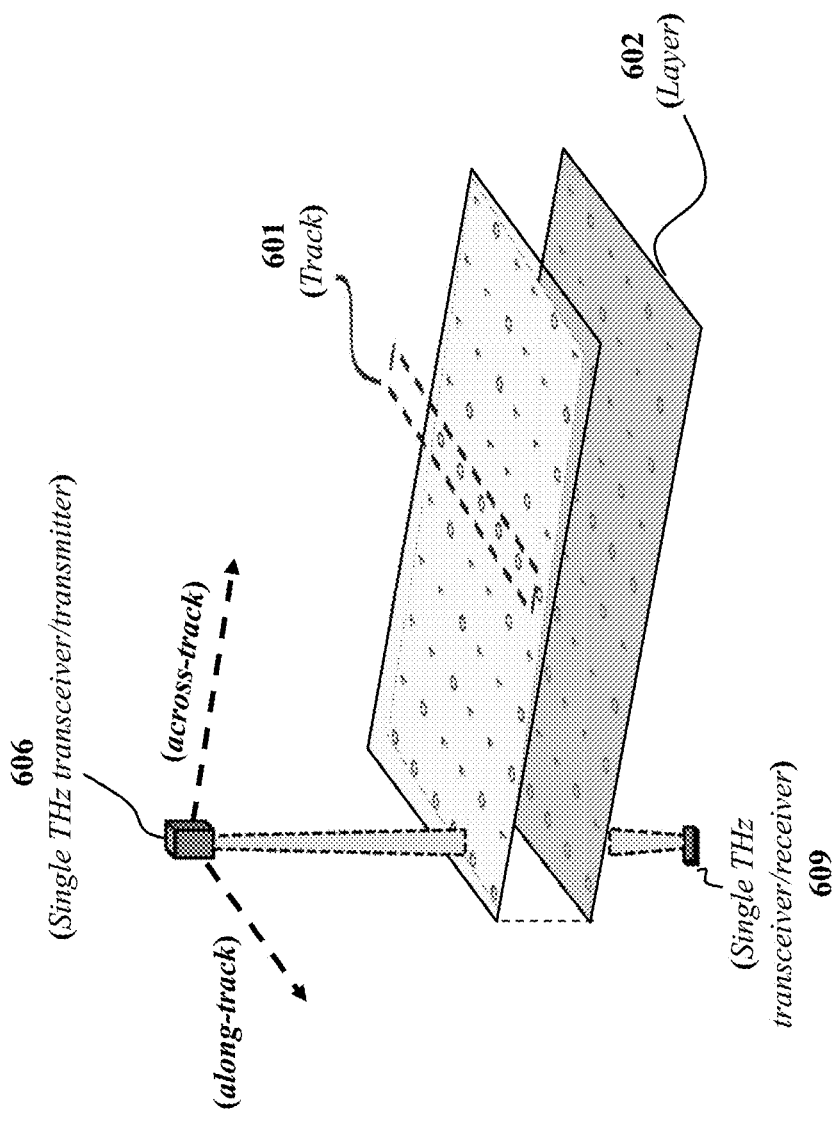
FIG. 6A is a schematic illustrating using a single THz transceiver to mechanically scan the multi-layer, multi-track, multi-level scale, according to embodiments of the present disclosure.

FIG. 6A shows a schematic of using a single THz transceiver 606 to mechanically scan the multi-layer 602, multi-track 601, multi-level scale, i.e., across the track and along the track, to receive the reflected waveforms to identify the coded pattern for the position. Alternatively, the single THz transceiver can be a transmitter, wherein the transmitted THz waveform passes through the multi-layered scale, and is received by a receiver 609. In particular, the transmitted THz waveform passes through the multi-layered/multi-level scale, and the THz waveform continues directly to the receiver 609 to identify the coded pattern for the position.

Figure 6B:
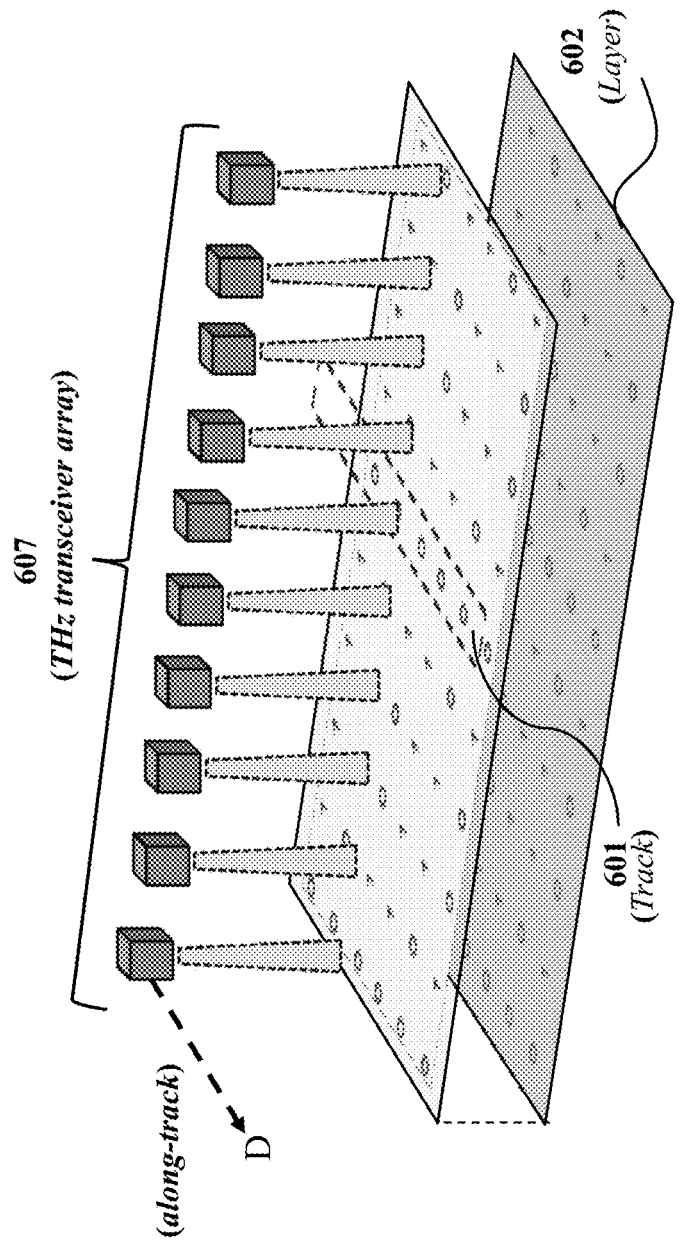
FIG. 6B is a schematic illustrating using multiple THz transceivers with each THz transceiver aligned with one track, according to embodiments of the present disclosure.

FIG. 6B shows a schematic of using multiple THz transceivers 607 (or a THz transceiver array), wherein each THz transceiver in the array can be aligned with a single track

601. Each THz transceiver can also be able to receive the reflected waveforms to identify the coded pattern of corresponding track for the position. The THz transceiver array 607 can move simultaneously along the track direction D for absolute positioning.

Figure 6C:
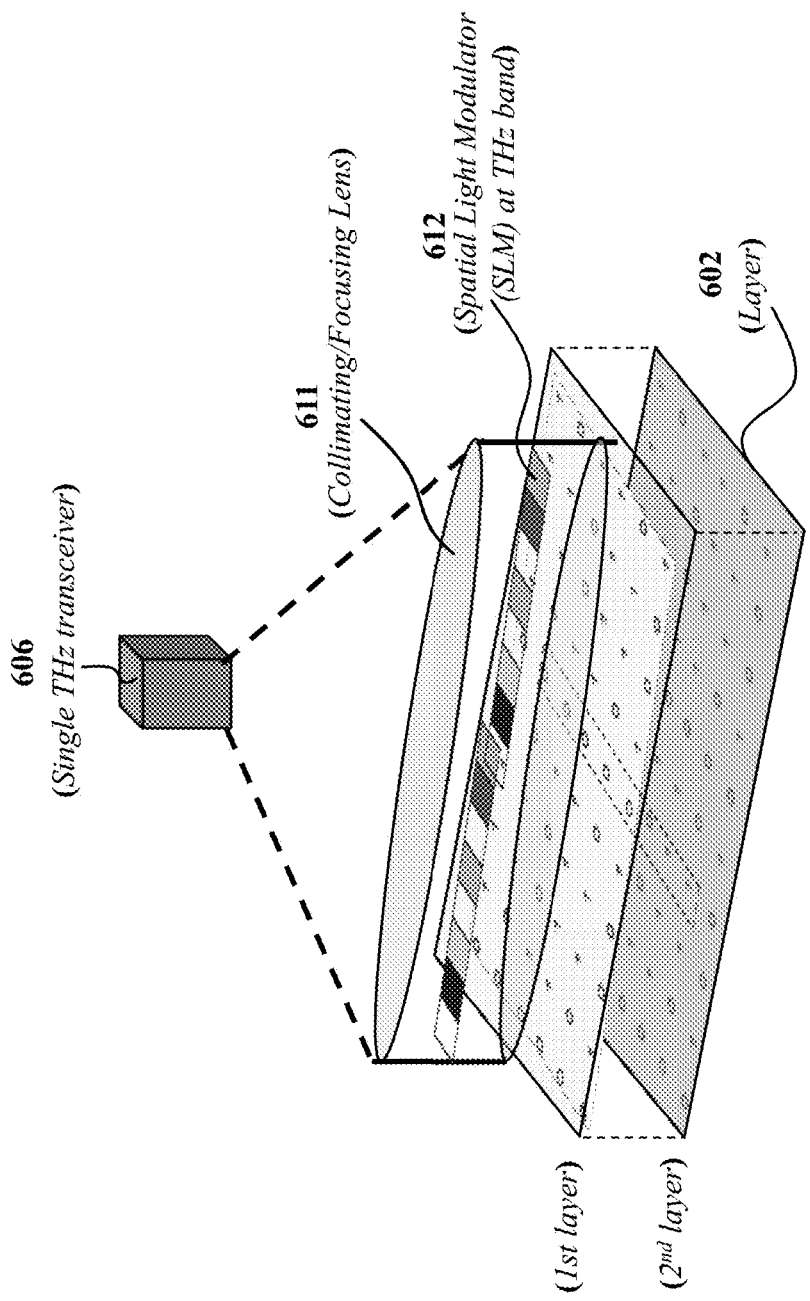
FIG. 6C is a schematic illustrating using a single THz transceiver together with collimating/focusing lenses, spatial light modulators at the THz band, according to embodiments of the present disclosure.

FIG. 6C shows a schematic of using a single THz transceiver 606 together with collimating/focusing lenses 611, spatial light modulators 612 at the THz band. The single transceiver 606 sends the THz waveform to the collimating lens 611. The waveform is collimated by the collimating lens 611 and then modulated by the spatial light modulator 612 with random patterns. The reflected THz waveform passes through the focusing lens 611 and detected by the single THz transceiver 606.

Figure 6D:
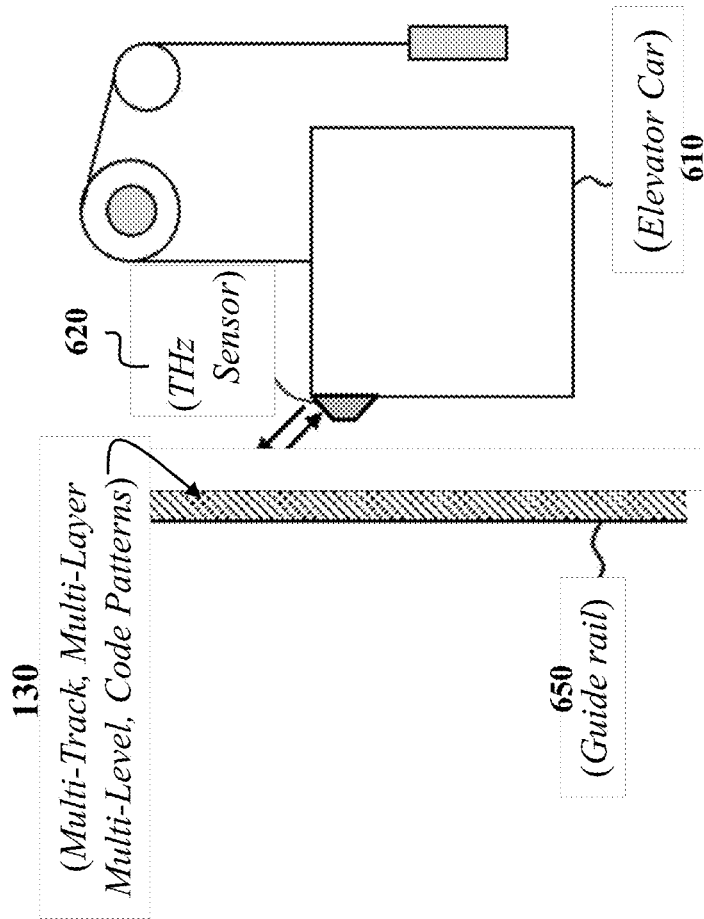
FIG. 6D is a schematic illustrating a elevator system using position encoder according to some embodiments to determine a position of the elevator car, according to embodiments of the present disclosure.

FIG. 6D shows a schematic of elevator system using a position encoder according to some embodiments of the present disclosure, to determine a position of the elevator car 610. The scale 130 of FIG. 1B is installed at the guide rails 650 of the elevator system. The THz position detector 620 that includes emitters and receivers, can be installed on elevator car 610, and positioned so as to transmit the THz waveform to the scale 130 and receive reflected THz waveform back from the scale 130.

Figure 6E:
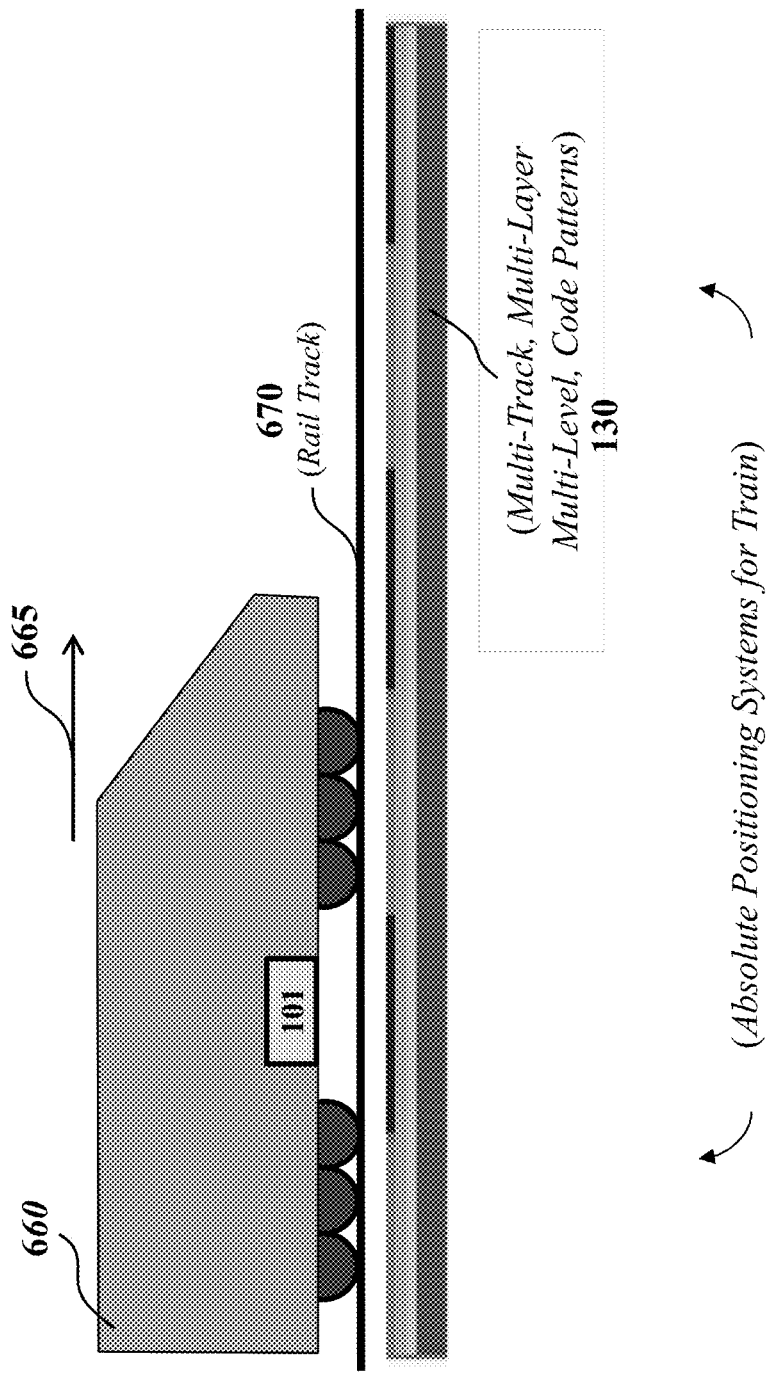
FIG. 6E is a schematic illustrating a train system using principles of some embodiments to determine a position of a train moving on the railroad track, according to embodiments of the present disclosure.

FIG. 6E shows a schematic of a train system using position decoder 101 of FIG. 1B, according to some embodiments of the present disclosure, to determine a position of the train 660 moving on the railroad track 670 along the direction 665. In this particular embodiment, the position detector 101 can be installed on the train 660, while the scale 130 of FIG. 1B can be arranged on or approximate the railroad track 670.

Figure 7:
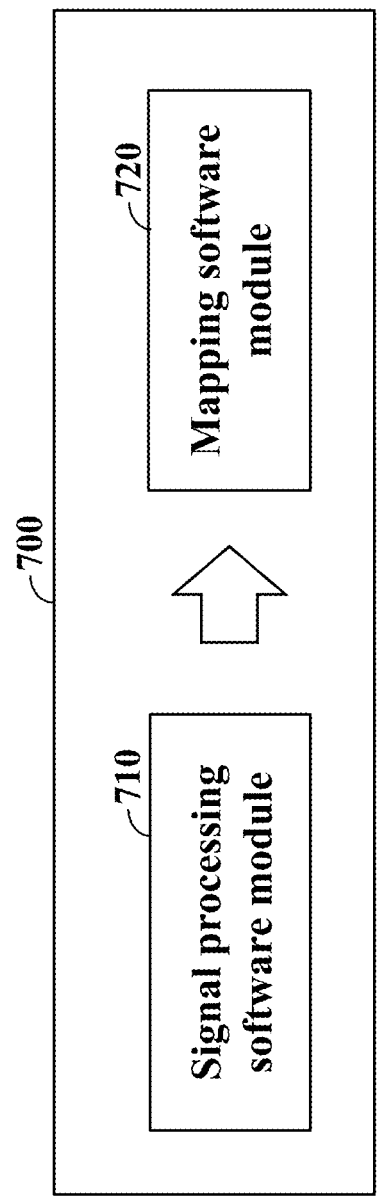
FIG. 7 is a block diagram illustrating a non-transitory computer readable medium embodied thereon a program executable by a processor for performing position estimation, according to embodiments of the present disclosure.

FIG. 7 shows an exemplar schematic of a non-transitory computer readable medium 700, having embodied thereon, a program executable by a processor for performing position estimation according to different embodiments of the present disclosure. The program can be organized in a number of software modules for executing different functions of the position information system 110 of FIG. 1B.

For example, the signal processing software 710 can be responsible for preparing the received signal indicative of measurements of amplitudes of the waveform reflected from the scale. For example, the signal processing software 710 can remove noise from the signal as well as normalize, sample, threshold, and/or modulate the signal. The mapping module 720 receives the processed signal and maps the processed signal to the position of the encoder.

Figure 8A:
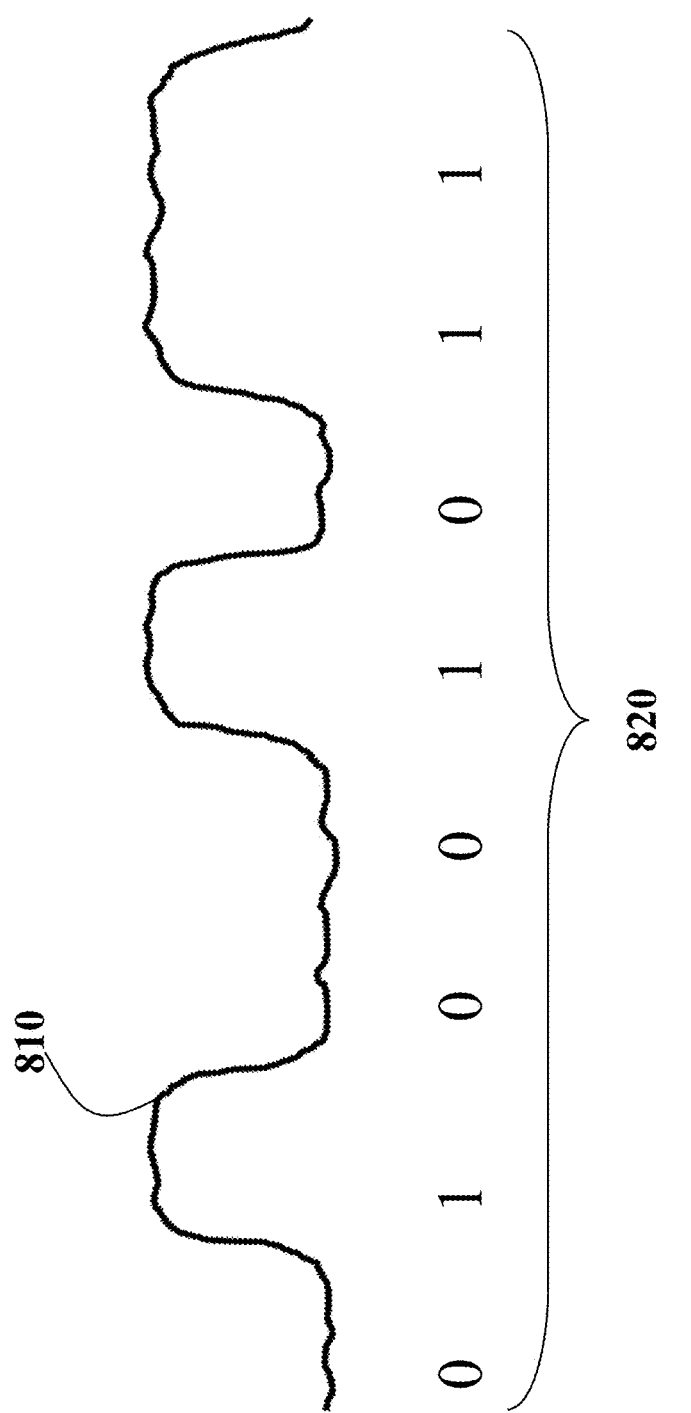
FIG. 8A and FIG. 8B are schematic illustrating performance of modules of FIG. 7, according to embodiments of the present disclosure.
Figure 8B:
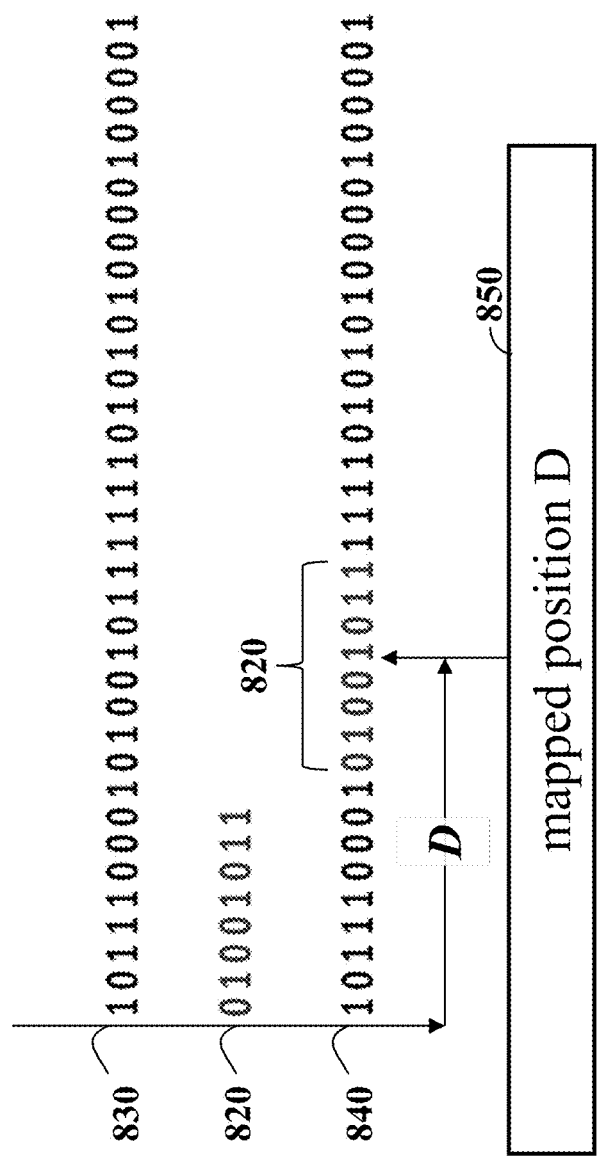

FIGS. 8A and 8B show schematics of performance of the modules of FIG. 7, according to some embodiments of the present disclosure. For example, FIG. 8A shows an illustration of the signal 810 indicative of measurements of amplitudes of the waveform, and a corresponding decoded sequence 820. The decoded sequence 820 can be a part of de Bruijn sequence encoding the position. A look-up table of length $2n$ can be used to determine the position decoded sequence within the entire de Bruijn sequence.

For example, FIG. 8B shows the code 830, which is de Bruijn sequence encoding the position, and the result 840 of matching the decoded sequence 820 with the portion of the de Bruijn sequence 830 to produce the position 850.

FIG. 9 shows a lookup table 930 providing a mapping between sequences of amplitude values of the reflected wave and the position of the emitter according to one embodiment. In this embodiment, the processor decodes the code 931 from the measurements of the amplitudes of the reflected wave, and maps the code 931 to the position of the emitter 932.

Figure 10A:
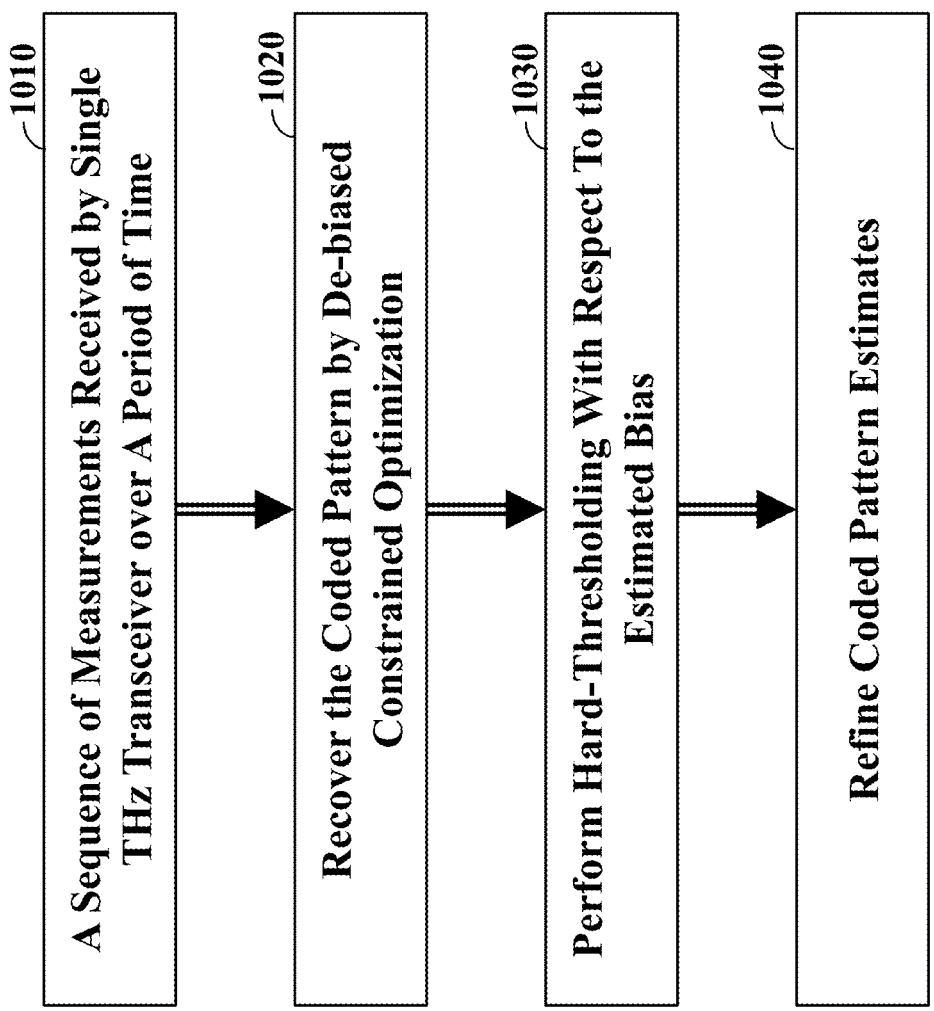
FIG. 10A is a block diagram illustrating a de-biased constrained optimization approach to recover the coded patterns from the compressed scanning scheme with a single THz transceiver, according to embodiments of the present disclosure.

FIG. 10A shows a block diagram of a de-biased constrained optimization approach to recover the coded patterns from the compressed scanning scheme with a single THz transceiver. Method step 1010 receives a sequence of measurements from the compressed scanning scheme with a single THz transceiver. The next step 1020 uses the sequence of measurements to obtain an initial estimate of the coded patterns via a de-biased constrained optimization approach. For example, the de-biased constrained optimization aims to recover an estimate of binary coded patterns by minimizing the least-squared fitting criterion under the constraint that the solution can be only one of two possible values or that the solution is within a range. The initial estimate of coded patterns is then hard-thresholded 1030 with respect to a baseline. The baseline can be the middle point of the two estimated values or the estimated range. With the hard-thresholded result, one can refine the estimate of the code pattern 1040.

Figure 10B:
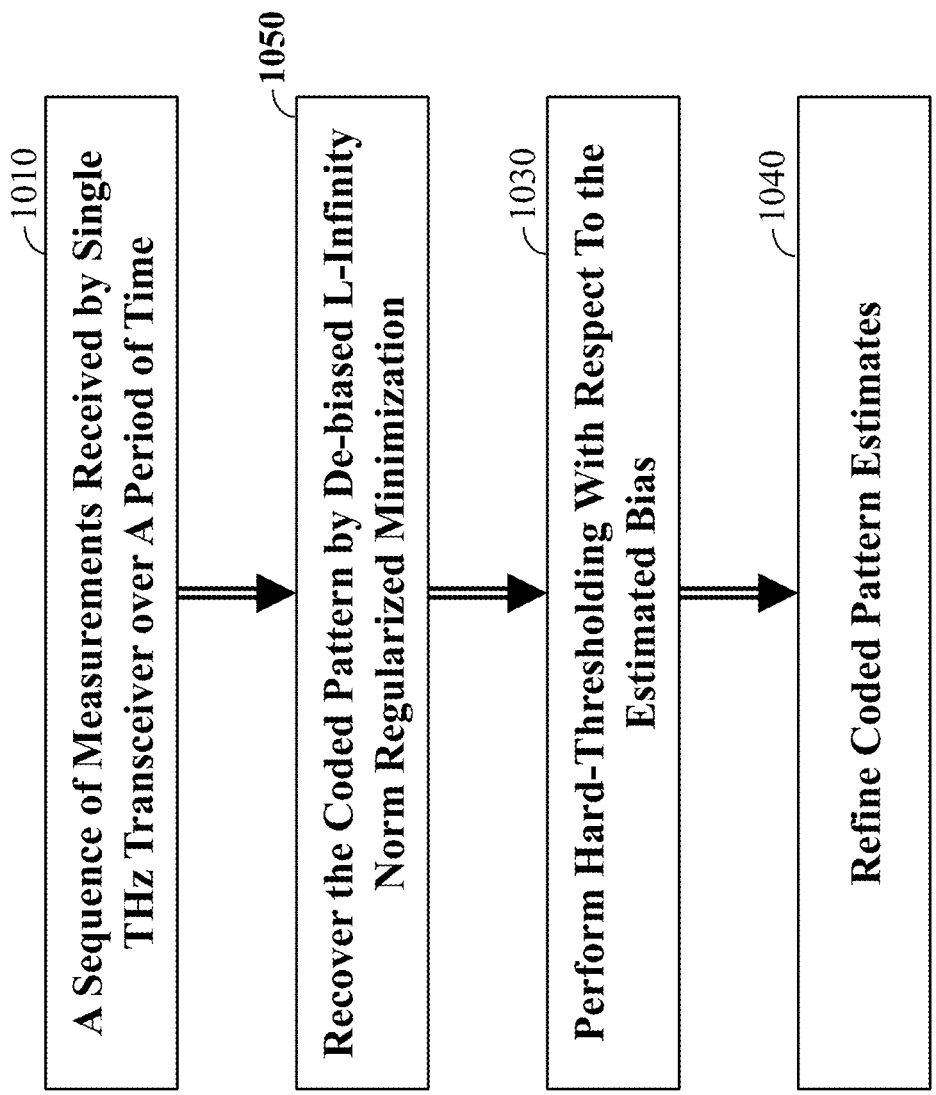
FIG. 10B is a block diagram illustrating a de-biased L-infinity norm regularized Minimization approach to recover the coded patterns from the compressed scanning scheme with a single THz transceiver, according to embodiments of the present disclosure.

FIG. 10B shows a block diagram of a de-biased L-infinity norm regularized minimization approach to recover the coded patterns from the compressed scanning scheme with a single THz transceiver. The method receives 1010 a sequence of measurements from the compressed scanning scheme with a single THz transceiver.

The next step 1050 uses the sequence of measurements to obtain an initial estimate of the coded patterns via a de-biased L-infinity norm regularized minimization. For example, the de-biased L-infinity norm regularized minimization recovers an initial estimate of binary coded patterns by minimizing the weighted sum of the least-squared fitting criterion and the L-infinity norm of the solution.

Referring to FIG. 10B, the initial estimate of coded patterns is then hard-thresholded 1030 with respect to a baseline. The baseline can be the middle point of the two estimated values or the estimated range. With the hard-thresholded result, one can refine the estimate of the code pattern 1040.

Figure 10C:
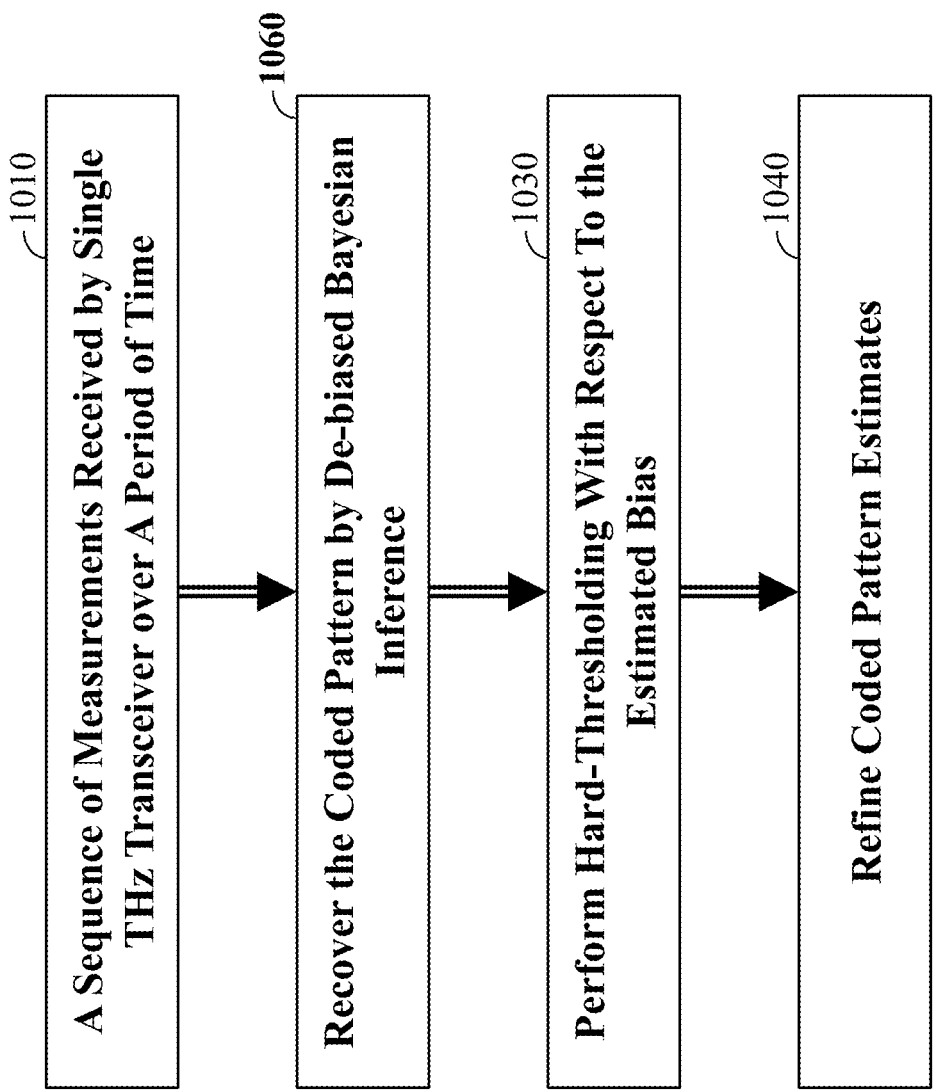
FIG. 10C is a block diagram illustrating a de-biased Bayesian inference approach to recover the coded patterns from the compressed scanning scheme with a single THz transceiver, according to embodiments of the present disclosure.

FIG. 10C shows the block diagram of a de-biased Bayesian inference approach to recover the coded patterns from the compressed scanning scheme with a single THz transceiver. The method receives 1010 a sequence of measurements from the compressed scanning scheme with a single THz transceiver.

The next step 1060 uses the sequence of measurements to obtain an initial estimate of the coded patterns via a Bayesian inference approach. For example, the Bayesian inference approach recovers an initial estimate of binary coded patterns by imposing a prior distribution on the solution and iteratively maximizing the posterior likelihood function.

Referring to FIG. 10C, the initial estimate of coded patterns is then hard-thresholded 1030 with respect to a baseline. The baseline can be the middle point of the two estimated values or the estimated range. With the hard-thresholded result, one can refine the estimate of the code pattern 1040.

Figure 10D:
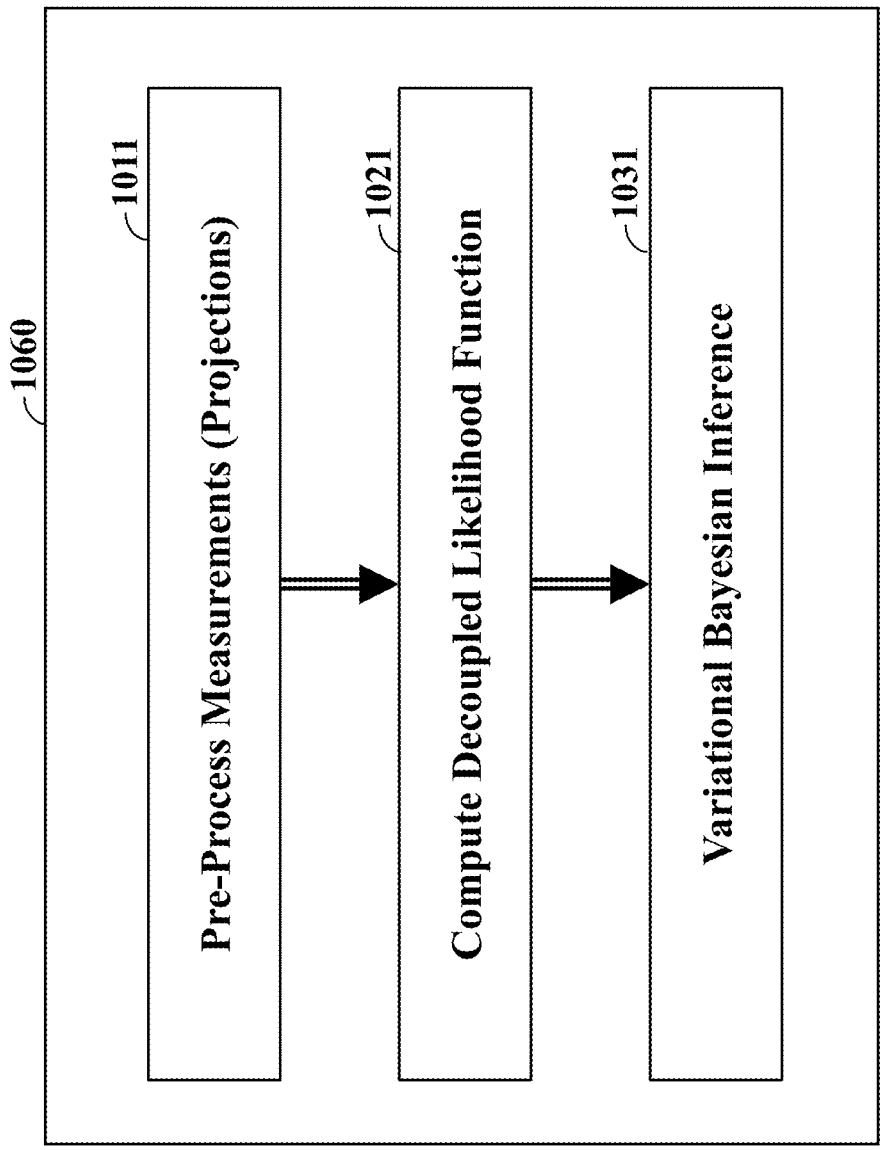
FIG. 10D is a block diagram illustrating steps of the de-biased Bayesian inference approach to recover the coded patterns from the compressed scanning scheme with a single THz transceiver, according to embodiments of the present disclosure.

FIG. 10D shows the detailed steps of the de-biased Bayesian inference approach 1060 of FIG. 10C, to recover the coded patterns from the compressed scanning scheme with a single THz transceiver. It includes a step 1011 to pre-process the measurements including the projection of the measurement into a subspace, a step 1021 to compute the approximated decoupled likelihood function, and a step 1031 to use the variational Bayesian inference to update the deterministic unknown parameters.

During experimentation, experiments includes THz sensing in either a reflection or transmission mode. Some experiments included gas sensing, moisture analysis, non-destructive evaluation, biomedical diagnosis, package inspection, and security screening. Learned from experimentation is that by sending an ultra-short pulse (e.g., 1-2 picoseconds), the THz system is able to inspect not only the top surface of the sample but also its internal structure, either a defect underneath the top layer or a multi-layer structure, due to its capability of penetrating a wide range of non-conducting materials. At the same time, the ultra-short pulse can also give rise to ultra-wideband spectrum over a band of several THz, providing a spectroscopic inspection of material properties of the sample, according to some experiments experimented during experimentation.

Learned from experimentation is that the THz can operate in a raster or compressed scanning mode. In the raster scanning mode, as shown in FIG. 6A, a sample under inspection can be illuminated by a THz point source with a time-compact source pulse and a small spot size (or aperture). Also, the THz emitter can send a focused beam at a normal incident angle to inspect a small area (or a pixel) of the sample, the detector then samples corresponding reflected waveform via a electro-optic sampling process, and a programmable mechanical raster moves the sample in the plane perpendicular to the incidental waveform in order to measure the two-dimensional surface of the sample. Further learned from experimentation is that the THz with the raster scanning mode can have a fast scanning rate (up to 1000 Hz) and may be applied to, among other industrial applications, art and archaeology, quality control, thickness estimation and multi-layer content extraction. However, discovered from experimentation is at least one key challenge, that is, how to address the depth variations and its induced delay/phase variation from one pixel to another, due to either the irregular sample surface, or the vibration from the mechanical scanning process.

What was discovered during experimentation is that in a compressed scanning mode, as shown in FIG. 6C, the THz pulse can be first collimated to a broad beam, and then spatially encoded with a random mask with the help of a spatial light modulator (SLM) that operates in the terahertz regime. Wherein, at the receiver side, the spatially encoded beam can be re-focused by a focusing lens and received by a single-pixel photoconductive detector. In other words, what was learned from experimentation is that only one measurement is formed for a mask at a time. Such that, the compressed scanning process repeats with different realizations of random masks and collects multiple sequential measurements. The sample image can then be recovered by, normally, using sparsity-driven minimization methods. Also discovered is that a total-variation minimization method can be used to reconstruct the sample image of a Chinese character, "light", with a small number of measurements than the number of pixels.

Signal Model

FIG. 11A is a graph illustrating a truncated Gaussian mixture prior distribution for binary coefficients which is to be estimated, according to embodiments of the present disclosure. FIG. 11B is a schematic illustrating the overall hierarchical signal model including the noise and prior distributions on the unknown coefficients and hyperprior parameters, according to embodiments of the present disclosure.

Let $x=[x_1, x_2, \ldots, x_N]^T$ denote a binary reflectance vector by stacking the columns of the two-dimensional reflectance matrix of the sample. As the THz source illuminates the sample from a spatially encoded mask, the received measurement can be expressed as $$y = Ax + v, x_n \in \{\mu_1, \mu_2\}; \quad (1)$$

where $A=[a_1, \ldots, a_M]^T$ is the measurement matrix, $v=[v_1, \ldots, v_M]^T$ is the Gaussian distributed noise with zero mean and an unknown variance $\beta^{-1}$, $y=[y_1, \ldots, y_M]^T$, M is the number of measurements, and $\mu_i$ for i=1,2 are two unknown reflectance coefficients. Moreover, the reflectance coefficient is assumed to be non-negative, i.e., $x_n \geq 0$. The signal model of (1) can, in fact, describe both raster and compressed scanning acquisitions:

In the case of the raster scanning, i.e., each pixel is illuminated and measured individually, we have M=N and A reduces to a diagonal matrix with diagonal elements responsible for the depth variation.

In the case of the compressed scanning, we have M<N and each row of the measurement matrix A corresponds to one random mask pattern used to form one measurement $y_m$.

To account for the non-negative binary feature of x, we introduce the following hierarchical Gaussian mixture prior distribution, $$p(x_n | \alpha_{n,1}, \alpha_{n,2}, c_n; \mu_1, \mu_2) = N_+(x_n; \mu_1, \alpha_{n,1}^{-1})^{c_n} \cdot N_+(x_n; \mu_2, \alpha_{n,2}^{-1})^{1-c_n}, \quad (2)$$

where $c_n \in \{0,1\}$ is a binary latent label variable for the pixel $x_n$, and the truncated Gaussian distribution is given as $$N_+(x; \mu, \alpha^{-1}) = \begin{cases} \eta^{-1} \sqrt{\frac{\alpha}{2\pi}} \exp\left(-\frac{\alpha(x-\mu)^2}{2}\right), & x \geq 0, \\ 0, & x < 0, \end{cases} \quad (3)$$

with $\mu$ as its mean, $\alpha^{-1}$ as the variance (or $\alpha$ as the precision parameter) and $\eta=1-\Phi(-\mu\sqrt{\alpha})$ as the normalization factor where $\Phi(\bullet)$ is the cumulative distribution function of the standard normal distribution. In addition, the binary label vector $=[c_1, \ldots, c_N]^T$ follows an i.i.d. Bernoulli distribution with parameter $\pi$ $$p(c_n; \pi) = (\pi)^{c_n}(1-\pi)^{1-c_n}. \quad (4)$$

We can show that the pixel-wise reflectance coefficient $x_n$ has independent truncated Gaussian mixture prior distribution by integrating over the latent label variable $c_n$ $$p(x_n | \alpha_{n,1}, \alpha_{n,2}; \mu_1, \mu_2) = \quad (5)$$
$$\sum_{c_n \in \{0,1\}} p(x_n | \alpha_{n,1}, \alpha_{n,2}, c_n; \mu_1, \mu_2) p(c_n; \pi) =$$
$$\pi N_+(x_n; \mu_1, \alpha_{n,1}^{-1}) + (1-\pi) N_+(x_n; \mu_2, \alpha_{n,2}^{-1}).$$

The resulting truncated Gaussian mixture prior distribution 1101 of $x_n$ is illustrated in FIG. 11(A) with pixel-dependent precision parameters, i.e., $\alpha_{n,1}$ and $\alpha_{n,2}$, and two shared mean parameters $\mu_1$ and $\mu_2$.

Furthermore, we treat the pixel-dependent precision parameters $\alpha_1=[\alpha_{1,1},\ldots,\alpha_{N,1}]^T$ and $\alpha_2=[\alpha_{1,2},\ldots,\alpha_{N,2}]^T$ as i.i.d. random variables and assume the Gamma distribution as their hyperprior distribution $$p(\alpha_1, \alpha_2; a, b) = \prod_{i=1}^{2} \prod_{n=1}^{N} \text{Gamma}(\alpha_{n,i} \mid a, b) \quad (6)$$

where $\text{Gamma}(\alpha|a,b)=\Gamma(a)^{-1}b^a\alpha^{a-1}e^{-b\alpha}$ with $a=b=10^{-6}$ for non-informative hyperpriors.

Overall, the hierarchical signal model can be described in a graphical representation shown in FIG. 11(B), where blue and red circles denote observed and hidden random variables, respectively, squares denote the unknown deterministic model parameters, and diamonds denote the pre-determined user parameters ($\pi$, a and b).

Solutions

In the case of binary reflection (complete absorption and reflection), the maximum likelihood (ML) estimation is given by $$\hat{x} = \arg\min_{x\in[0,1]^N} \|y - Ax\|^2,$$

which is often computationally intractable, especially when the dimension N is large.

The simplest relaxation of the ML estimation is to relax the feasible set to the N dimensional space $$\hat{z} = \arg\min_{x\in\mathbb{R}^N} \|y - Az\|^2,$$

which essentially removes the constraints and converts the discrete optimization problem into a continuous one. Since the cost function is convex in its variable, this problem has a unique minimum. and the decorrelator takes the sign of the above solution $\hat{x}=\text{sign}\{z\}$ The constraint set consists of corner points of the unit hypercube (box). An effective way to find an approximated solution is to relax the constraint set to cover the whole hypercube and convert to a convex programming problem $$\hat{z} = \arg\min_{x\in[0,1]^N} \|y - Az\|^2.$$

Both the cost function and the constraint set are convex. Thus, it has a unique minimum. However, the optimum point does not have a closed form and one should use iterative methods to find the solution. Then the solution is hard-thresholded to produce the final binary estimate $\hat{x}=\text{sign}\{z\}$ We can also use the L-infinity norm regularized to solve the problem of interest, particularly when the range of constraint set is not known.

$$[\hat{z}, \hat{u}_1, \hat{u}_2] = \arg\min_{u_1,u_2,x\in[u_1,u_2]^N} \|y - Az\|^2$$

where the hypercube constraint may not be symmetric. Denoting $b=(u_1+u_2)/2$ and $c=(u_2-u_1)/2$, the above optimization problem is equivalent to $$[\hat{w}, \hat{b}, \hat{c}] = \arg\min_{b,c,w\in[-c,c]^N} \|y - ba - Aw\|^2,$$

where $$a = A1_N = \sum_{n=1}^{N} a_n.$$

The middle point of the unknown range can be estimated as $\hat{b}=(a^Ta)^{-1}a^T(y-Aw)$ and the remaining optimization reduces to $$[\hat{w}, \hat{c}] = \arg\min_{c,w\in[-c,c]^N} \|P_a^\perp y - P_a^\perp Aw\|^2$$

$$= \arg\min_{c,w\in[-c,c]^N} \|\tilde{y} - \tilde{A}w\|^2$$

where $P_h^\perp=I_M-(h^Th)^{-1}hh^T$ is the projection matrix onto the orthogonal complement space of h, $\tilde{y}=P_h^\perp y$, and $\tilde{H}=P_h^\perp H$.

One way to solve this optimization problem is to use the L-infinity regularized minimization $$\hat{w} = \min_{w} \|\tilde{y} - \tilde{H}w\|^2 + \lambda\|w\|_\infty$$

This L-infinity regularized minimization can be solved iteratively by FITRA algorithm. Once w is estimated, we can perform the hard-threshold operation with respect to zero and estimate the coefficient c using the estimated sign.

Another way to solve the problem of interest is to derive a variational Bayesian inference for the posterior distribution of the hidden random variables and a cost function to update the deterministic model parameters. Particularly, a two-step approach is used: First, we factorize the original likelihood function, coupled over x due to the measurement matrix A, into a pixel-wise decoupled likelihood function with the principle of GAMP. Second, with the decoupled likelihood function on x, the variational expectation-maximization (EM) algorithm is used to derive the posterior distribution and the Q-function to update the unknown model parameters.

Pixel-Wise Decoupled Likelihood Function:

The likelihood function of y is given by $$p(y \mid x; \beta) = (2\pi\beta^{-1})^{-M/2} e^{-\frac{\beta\|y-Ax\|_2^2}{2}}$$

where each measurement $y_m$ is coupled with all pixels $\{x_n\}_{n=1}^{N}$. In order to enable a fast, pixel-wise Bayesian inference, we can approximate the likelihood function of y onto the pixel coefficient $x_n$:

$$p(y|x;\beta) \approx \prod_{n=1}^{N} p(x_n|\hat{r}_n, \hat{\tau}_n) = \prod_{n=1}^{N} \frac{1}{\sqrt{2\pi\hat{\tau}_n}} e^{-\frac{(x_n-\hat{r}_n)^2}{2\hat{\tau}_n}}$$

In other words, the approximated marginal likelihood function is given by $x_n \sim \mathcal{N}(\hat{r}_n, \hat{\tau}_n)$ where the approximated mean $\hat{r}_n$ and variance $\hat{\tau}_n$ can be found by the GAMP algorithm. As a result, the likelihood function of y is factorized as a product of independent decoupled likelihood function of $x_n$ with mean $\hat{r}_n$ and variance $\hat{\tau}_n$.

Variational Bayesian Inference: Given the decoupled likelihood function, we use the variational Bayesian framework to derive the posterior distributions of all hidden random variables $z=\{x,\alpha_1,\alpha_2,c\}$ (circles 1204 in FIG. 12B), and then update the unknown deterministic parameters=$\{\beta,\mu_1,\mu_2\}$ (squares in FIG. 12B) by maximizing the expectation of the complete likelihood function over the posterior distribution of the hidden variables.

Posterior distributions of hidden variables $\{x,\alpha_1,\alpha_2,c\}$: In the conventional Bayesian framework, the posterior of the hidden variables can be found via the E-step of the EM framework. Generally, the E-step is to find a probability density function q(z) which, given the current estimate of the model parameters $\theta$, maximizes the marginal likelihood of the measurement $p(y;\theta)$. With the variational Bayesian framework, we can factorize $q(z) \approx q(x)q(\alpha_1)q(\alpha_2)q(c)$ and, instead of joint optimization over z, the E-step can find the optimal probability density function of each class of hidden variables, leading to $$\ln q(x) = \langle \ln p(y,z;\theta) \rangle_{q(\alpha_1)q(\alpha_2)q(c)} + \text{const},$$

$$\ln q(\alpha_1) = \langle \ln p(y,z;\theta) \rangle_{q(x)q(\alpha_2)q(c)} + \text{const},$$

$$\ln q(\alpha_2) = \langle \ln p(y,z;\theta) \rangle_{q(x)q(\alpha_1)q(c)} + \text{const},$$

$$\ln q(c) = \langle \ln p(y,z;\theta) \rangle_{q(x)q(\alpha_1)q(\alpha_2)} + \text{const},$$

where $p(y,z) = p(y,x,\alpha_1,\alpha_2,c;\theta)$ is the complete likelihood function of the observable and hidden variables and $q(\cdot)$ is the posterior distribution of the corresponding class of hidden variables.

We start with the first class of hidden variables: the pixel-wise reflectance coefficient x. By keeping terms related to $x_n$, we can show that $\{x_n\}_{n=1}^{N}$ have independent truncated Gaussian posterior distributions $$q(x_n) = \begin{cases} \phi_n^{-1} \frac{1}{\sqrt{2\pi}\,\tilde{\sigma}_n} \exp\left(-\frac{(x_n-\tilde{\mu}_n)^2}{2\tilde{\sigma}_n^2}\right), & x_n \geq 0, \\ 0, & x_n < 0, \end{cases}$$

where the posterior mean $\tilde{\mu}_n$ and posterior variance $\tilde{\sigma}_n^2$ are given as $$\tilde{\sigma}_n^2 = (\langle c_n \rangle \langle \alpha_{n,1} \rangle + \langle 1-c_n \rangle \langle \alpha_{n,2} \rangle + 1/\hat{\tau}_n)^{-1},$$

$$\tilde{\mu}_n = (\langle c_n \rangle \langle \alpha_{n,1} \rangle \mu_1 + \langle 1-c_n \rangle \langle \alpha_{n,2} \rangle \mu_2 + \hat{r}_n/\hat{\tau}_n)\tilde{\sigma}_n^2,$$

with $\phi_n = 1 - \Phi(-\tilde{\mu}_n/\tilde{\sigma}_n)$ as the normalization factor.

For the second class of hidden variables of $\alpha_1$, its posterior distribution is the Gamma distribution $$q(\alpha_{n,1}) = \text{Gamma}(\alpha_{n,1}|\tilde{a}_{n,1},\tilde{b}_{n,1}),$$

with $\tilde{a}_{n,1} = a + 0.5 \langle c_n \rangle$ and $\tilde{b}_{n,1} = b + 0.5 \langle c_n \rangle \langle (x_n-\mu_1)^2 \rangle$.

Similarly, for the third class of $\alpha_2$, its posterior distribution is also the Gamma distribution $$q(\alpha_{n,2}) = \text{Gamma}(\alpha_{n,2}|\tilde{a}_{n,2},\tilde{b}_{n,2}),$$

with $\tilde{a}_{n,2} = a + 0.5 \langle 1-c_n \rangle$ and $\tilde{b}_{n,2} = b + 0.5 \langle 1-c_n \rangle \langle (x_n-\mu_2)^2 \rangle$.

Finally, for the latent label variable c, its posterior distribution is the Bernoulli distribution $$\ln q(c_n) = (l_{n,1} - l_{n,2})c_n + \text{const},$$

with $l_{n,1} = 0.5 \langle \ln \alpha_{n,1} \rangle - 0.5 \langle \alpha_{n,1} \rangle \langle (x_n-\mu_1)^2 \rangle - \langle \ln \eta_{n,1} \rangle + \ln \pi$, $l_{n,2} = 0.5 \langle \ln \alpha_{n,2} \rangle - 0.5 \langle \alpha_{n,2} \rangle \langle (x_n-\mu_2)^2 \rangle - \langle \ln \eta_{n,2} \rangle + \ln(1-\pi)$. To compute the above parameters associated with the posterior distributions, we need the following expressions:

$$\langle x_n \rangle = \tilde{\mu}_n + \tilde{\sigma}_n \cdot \phi(-\tilde{\mu}_n/\tilde{\sigma}_n)/\phi_n, \langle x_n^2 \rangle = \tilde{\sigma}_n^2 + \tilde{\mu}_n \cdot \langle x_n \rangle,$$

$$\langle \alpha_{n,i} \rangle = \tilde{a}_{n,i}/\tilde{b}_{n,i}, \langle \ln \alpha_{n,i} \rangle = \psi(\tilde{a}_{n,i}) - \ln \tilde{b}_{n,i}, i=1,2,$$

$$\langle c_n \rangle = (1 + e^{l_{n,2}-l_{n,1}})^{-1},$$

where $$\psi(a) = \frac{\partial}{\partial a} \ln \Gamma(a)$$

is the digamma function.

Updating for deterministic parameters $\{\beta,\mu_1,\mu_2\}$: The next step is to find an updating rule for the deterministic unknown parameters by maximizing the following Q-function $$\{\theta^{(k+1)}\} = \max_\theta Q(\theta, \theta^{(k)}) = \operatorname*{argmin}_\theta \langle \ln p(y, z; \theta) \rangle_{q(z)}$$

First derive the updating rule for the noise variance $\beta^{-1}$, $$(\beta^{-1})^{(k+1)} = \frac{\sum_{m=1}^{M} \langle (y_m - w_m)^2 \rangle}{M},$$

where $w_m$ is the m-th element of $w = Ax$. Then we obtain the updating rule for the two shared means $\mu_1$ and $\mu_2$. With the above derivations, the corresponding Q-function reduces to the function $g(\mu_1,\mu_2)$ defined as $$g(\mu_1, \mu_2) = \sum_{n=1}^{N} [\langle c_n \rangle (\langle \ln \eta_{n,1} \rangle - 0.5 \langle \alpha_{n,1} \rangle (\mu_1^2 - 2\langle x_n \rangle \mu_1)) - $$

$$(1 - c_n)(\langle \ln \eta_{n,2} \rangle - 0.5 \langle \alpha_{n,2} \rangle (\mu_2^2 - 2\langle x_n \rangle \mu_2))],$$

where the two normalization factors $\eta_{n,i} = 1 - \Phi(-\mu_i\sqrt{\alpha_{n,i}})$, $i=\{1,2\}$ are a function of the hidden variables $\{\mu_i\}_{i=1}^{2}$ and $\{\alpha_{n,i}\}_{i=1}^{2}$. As a result, we need to compute the expectation of $\ln \eta_{n,1}$ and $\ln \eta_{n,2}$ over the posterior distributions of these hidden variables which results in no closed-form expressions. Instead, we replace $\langle \ln \eta_{n,1} \rangle$ and $\langle \ln \eta_{n,2} \rangle$ by their current estimates from the previous iteration, i.e., $\ln \eta_{n,1}^{(k)}$ and $\ln \eta_{n,2}^{(k)}$. With this approximation, the updates of $\mu_1$ and $\mu_2$ are decoupled as $$\mu_1^{(k+1)} = \frac{\sum_{n=1}^{N} \langle c_n \rangle \langle \alpha_{n,1} \rangle \langle x_n \rangle}{\sum_{n=1}^{N} \langle c_n \rangle \langle \alpha_{n,1} \rangle},$$

$$\mu_2^{(k+1)} = \frac{\sum_{n=1}^{N} \langle 1 - c_n \rangle \langle \alpha_{n,2} \rangle \langle x_n \rangle}{\sum_{n=1}^{N} \langle 1 - c_n \rangle \langle \alpha_{n,2} \rangle},$$

which turn out to be the weighted averages of all posterior means. With the estimated x, one can perform hard-threshold operations on x with respect to the estimated middle point, and then refine the estimate of the binary reflectance coefficients.

Rather than relying on the sparsity assumption of the sample spatial pattern, we here exploit only the non-negative binary nature of reflectance coefficient of the sample and recover its reflectance pattern with compressed measurements. This is motivated by applications such as absolute positioning encoder systems where a non-sparse binary pseudo-random pattern (e.g., quick response (QR) code) may be used for the sample. To this end, the proposed method imposes a hierarchical truncated Gaussian mixture prior model to enforce the non-negative binary feature of the reflectance, and uses the principles of generalized approximate message passing (GAMP) and variational Bayesian inference to develop a decoupled pixel-wise iterative recovery algorithm for fast signal recovery. The key challenge here is that, to update the deterministic unknown parameters, i.e., the two unknown means of reflectance coefficients, we need to compute the expectation of the logarithm of two normalization factors (due to the truncated Gaussian mixture model) over the posterior distribution, resulting in no closed-form expressions. To address this issue, we propose an approximate, closed-form updating rule by replacing the expectations with its values from the previous iteration. The performance is numerically evaluated by using the Monte-Carlo simulation on a sample with a binary QR-like reflectance pattern.

Features

According to aspects of the present disclosure, the emitter emits the THz waveform to the scale according to one of a THz compressed scanning scheme, a THz Raster scanning scheme having a single THz transceiver, or a line scanning scheme having an array of THz transceivers or some combination thereof.

Another aspect of the present disclosure can include the emitter emits the THz waveform to the scale according to one of a THz compressed scanning scheme, a THz Raster scanning scheme having a single THz transceiver, or a line scanning scheme having an array of THz transceivers or some combination thereof, with reflected measurements, transmitted measurements, or both, to decode a single-row or multi-row patterns of at least one layer of the scale. Further another aspect can include the emitter emits the THz waveform to the scale according to a THz compressed scanning scheme with reflected measurements, transmitted measurements, or both, to decode a single-layer or multi-layer pseudo-random patterns for absolute positioning systems.

Another aspect of the present disclosure can include the emitter emits the THz waveform to the scale according to a THz compressed scanning scheme, such that the THz compressed scanning scheme uses an $\ell_\infty$-regularized least squared approach to decode the pseudo-random patterns with signal pre-processing steps. Further another aspect can include the emitter emits the THz waveform to the scale according to a THz compressed scanning scheme, such that the THz compressed scanning scheme uses a box-constrained optimization approach to decode the pseudo-random patterns with signal pre-processing steps.

Another aspect of the present disclosure can include the emitter emitting the THz waveform to the scale according to a THz compressed scanning scheme, such that the THz compressed scanning scheme uses prior distributions on the reflectance/transmission coefficients of patterns to identify signal features including positiveness and binary/multi-level values, with signal pre-processing steps. Wherein the processor uses a variational Bayesian approach to recover the reflected/transmitted THz waveform or a binary/multi-level reflectance waveform of the scale. Further, wherein the variational Bayesian approach used in the processor uses approximated Q function in the M-step of the EM (expectation-maximization) algorithm. Further still, wherein the EM algorithm is an iterative variational EM algorithm, so as to recover binary/multi-level patterns of the scale.

Figure 12A:
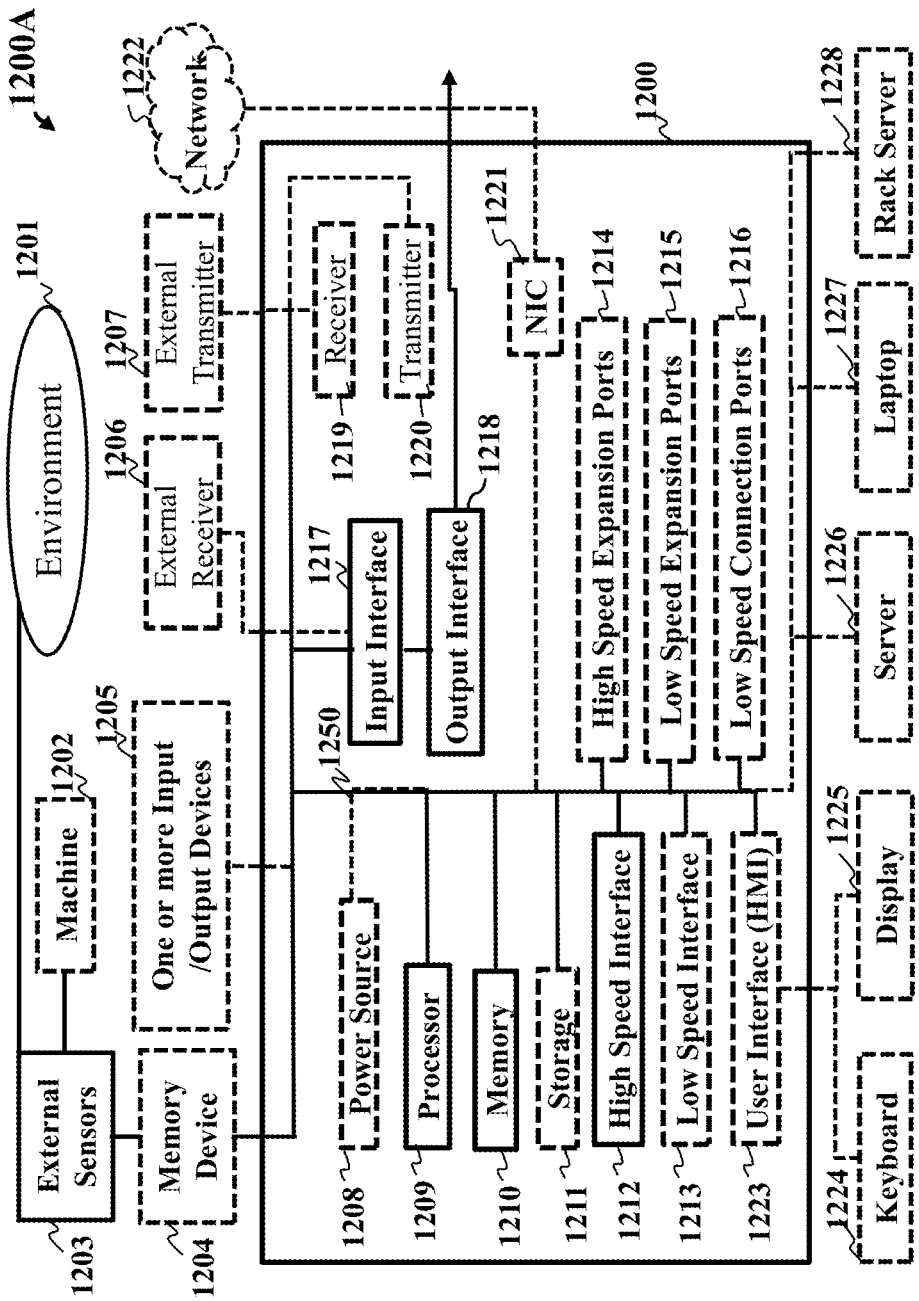
FIG. 12A is a schematic illustrating a computing apparatus that can be used to implement some techniques of the methods and systems, according to embodiments of the present disclosure.

FIG. 12A is a schematic illustrating by non-limiting example a computing apparatus 1200A that can be used to implement some techniques of the methods and systems, according to embodiments of the present disclosure. The computing apparatus or device 1200A represents various forms of digital computers, such as laptops, desktops, workstations, personal digital assistants, servers, blade servers, mainframes, and other appropriate computers.

The computing device 1200A can include a power source 1208, a processor 1209, a memory 1210, a storage device 1211, all connected to a bus 1250. Further, a high-speed interface 1212, a low-speed interface 1213, high-speed expansion ports 1214 and low speed connection ports 1215, can be connected to the bus 1250. Also, a low-speed expansion port 1216 is in connection with the bus 1250. Contemplated are various component configurations that may be mounted on a common motherboard, by non-limiting example, depending upon the specific application. Further still, an input interface 1217 can be connected via bus 1250 to an external receiver 1206 and an output interface 1218. A receiver 1219 can be connected to an external transmitter 1207 and a transmitter 1220 via the bus 1250. Also connected to the bus 1250 can be an external memory 1204, external sensors 1203, machine(s) 1202 and an environment 1201. Further, one or more external input/output devices 1205 can be connected to the bus 1250. A network interface controller (NIC) 1221 can be adapted to connect through the bus 1250 to a network 1222, wherein data or other data, among other things, can be rendered on a third party display device, third party imaging device, and/or third party printing device outside of the computer device 1200A.

Contemplated is that the memory 1210 can store instructions that are executable by the computer device 1200A, historical data, and any data that can be utilized by the methods and systems of the present disclosure. The memory 1210 can include random access memory (RAM), read only memory (ROM), flash memory, or any other suitable memory systems. The memory 1210 can be a volatile memory unit or units, and/or a non-volatile memory unit or units. The memory 1210 may also be another form of computer-readable medium, such as a magnetic or optical disk.

Still referring to FIG. 12A, a storage device 1211 can be adapted to store supplementary data and/or software modules used by the computer device 1200A. For example, the storage device 1211 can store historical data and other related data as mentioned above regarding the present disclosure. Additionally, or alternatively, the storage device 1211 can store historical data similar to data as mentioned above regarding the present disclosure. The storage device 1211 can include a hard drive, an optical drive, a thumb-drive, an array of drives, or any combinations thereof. Further, the storage device 1211 can contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 1209), perform one or more methods, such as those described above.

The system can be linked through the bus 1250 optionally to a display interface or user Interface (HMI) 1223 adapted to connect the system to a display device 1225 and keyboard 1224, wherein the display device 1225 can include a computer monitor, camera, television, projector, or mobile device, among others.

Still referring to FIG. 12A, the computer device 1200A can include a user input interface 1217 adapted to a printer interface (not shown) can also be connected through bus 1250 and adapted to connect to a printing device (not shown), wherein the printing device can include a liquid inkjet printer, solid ink printer, large-scale commercial printer, thermal printer, UV printer, or dye-sublimation printer, among others.

The high-speed interface 1212 manages bandwidth-intensive operations for the computing device 1200A, while the low-speed interface 1213 manages lower bandwidth-intensive operations. Such allocation of functions is an example only. In some implementations, the high-speed interface 1212 can be coupled to the memory 1210, a user interface (HMI) 1223, and to a keyboard 1224 and display 1225 (e.g., through a graphics processor or accelerator), and to the high-speed expansion ports 1214, which may accept various expansion cards (not shown) via bus 1250. In the implementation, the low-speed interface 1213 is coupled to the storage device 1211 and the low-speed expansion port 1215, via bus 1250. The low-speed expansion port 1215, which may include various communication ports (e.g., USB, Bluetooth, Ethernet, wireless Ethernet) may be coupled to one or more input/output devices 1205, and other devices a keyboard 1224, a pointing device (not shown), a scanner (not shown), or a networking device such as a switch or router, e.g., through a network adapter.

Still referring to FIG. 12A, the computing device 1200A may be implemented in a number of different forms, as shown in the figure. For example, it may be implemented as a standard server 1226, or multiple times in a group of such servers. In addition, it may be implemented in a personal computer such as a laptop computer 1227. It may also be implemented as part of a rack server system 1228. Alternatively, components from the computing device 1200A may be combined with other components in a mobile device (not shown), such as a mobile computing device 1200B. Each of such devices may contain one or more of the computing device 1200A and the mobile computing device 1200B, and an entire system may be made up of multiple computing devices communicating with each other.

Figure 12B:
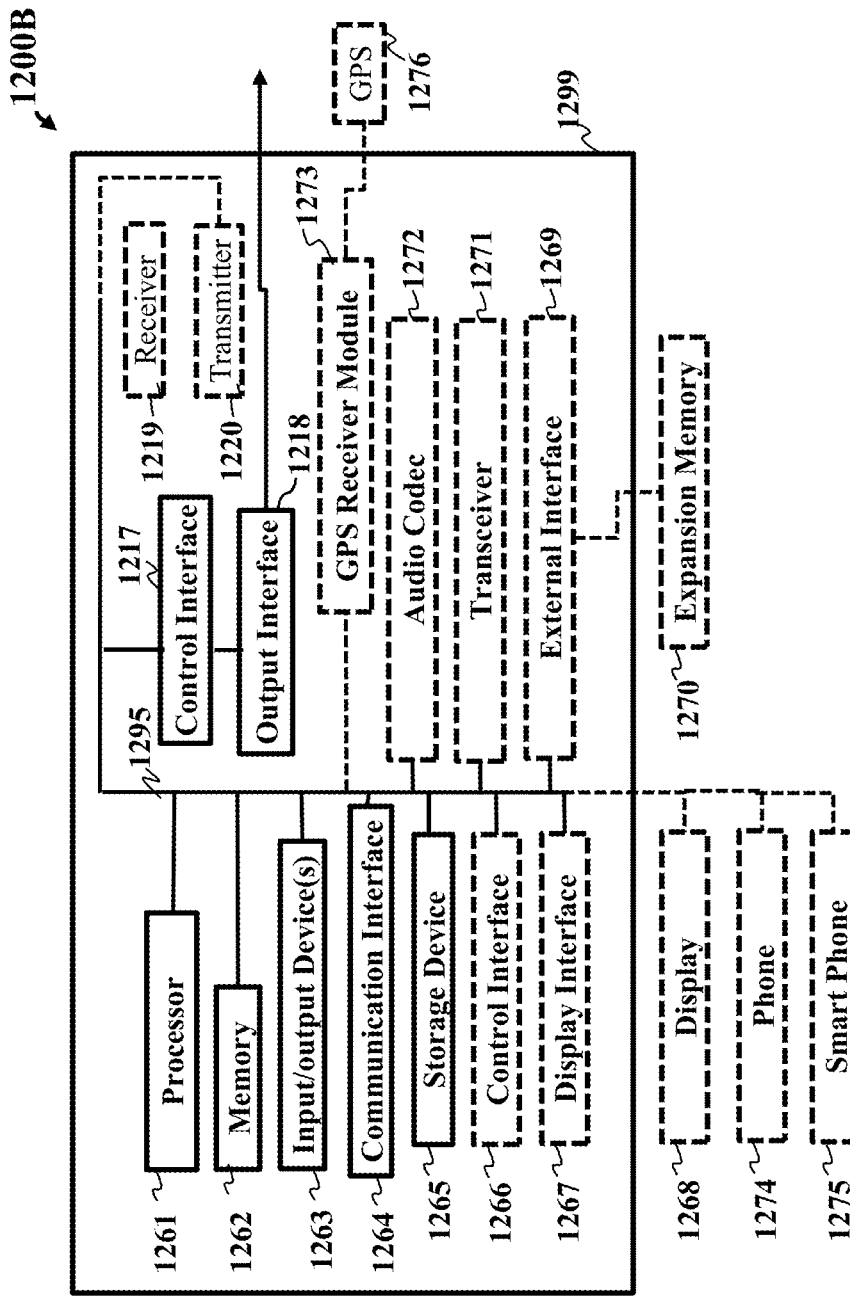
FIG. 12B is a schematic illustrating a mobile computing apparatus that can be used to implement some techniques of the methods and systems, according to embodiments of the present disclosure.

FIG. 12B is a schematic illustrating a mobile computing apparatus that can be used to implement some techniques of the methods and systems, according to embodiments of the present disclosure. The mobile computing device 1200B includes a bus 1295 connecting a processor 1261, a memory 1262, an input/output device 1263, a communication interface 1264, among other components. The bus 1295 can also be connected to a storage device 1265, such as a micro-drive or other device, to provide additional storage.

Referring to FIG. 12B, the processor 1261 can execute instructions within the mobile computing device 1200B, including instructions stored in the memory 1262. The processor 1261 may be implemented as a chipset of chips that include separate and multiple analog and digital processors. The processor 1261 may provide, for example, for coordination of the other components of the mobile computing device 1200B, such as control of user interfaces, applications run by the mobile computing device 1200B, and wireless communication by the mobile computing device 1200B. Contemplated are various component configurations that may be mounted on a common motherboard, by non-limiting example, 1299, depending upon the specific application.

The processor 1261 may communicate with a user through a control interface 1266 and a display interface 1267 coupled to the display 1268. The display 1268 may be, for example, a TFT (Thin-Film-Transistor Liquid Crystal Display) display or an OLED (Organic Light Emitting Diode) display, or other appropriate display technology. The display interface 1267 may comprise appropriate circuitry for driving the display 1268 to present graphical and other information to a user. The control interface 1266 may receive commands from a user and convert them for submission to the processor 1261. In addition, an external interface 1269 may provide communication with the processor 1261, so as to enable near area communication of the mobile computing device 1200B with other devices. The external interface 1269 may provide, for example, for wired communication in some implementations, or for wireless communication in other implementations, and multiple interfaces may also be used.

Still referring to FIG. 12B, the memory 1262 stores information within the mobile computing device 1200B. The memory 1262 can be implemented as one or more of a computer-readable medium or media, a volatile memory unit or units, or a non-volatile memory unit or units. An expansion memory 1270 may also be provided and connected to the mobile computing device 1299 through an expansion interface 1269, which may include, for example, a SIMM (single in line memory module) card interface. The expansion memory 1270 may provide extra storage space for the mobile computing device 1299, or may also store applications or other information for the mobile computing device 1299. Specifically, the expansion memory 1270 may include instructions to carry out or supplement the processes described above, and may include secure information also. Thus, for example, the expansion memory 1270 may be providing as a security module for the mobile computing device 1299, and may be programmed with instructions that permit secure use of the mobile computing device 1200B. In addition, secure applications may be provided via the SIMM cards, along with additional information, such as placing identifying information on the SIMM card in a non-hackable manner.

The memory 1262 may include, for example, flash memory and/or NVRAM memory (non-volatile random access memory), as discussed below. In some implementations, instructions are stored in an information carrier, that the instructions, when executed by one or more processing devices (for example, processor 1200B), perform one or more methods, such as those described above. The instructions can also be stored by one or more storage devices, such as one or more computer or machine readable mediums (for example, the memory 1262, the expansion memory 1270, or memory on the processor 1262). In some implementations, the instructions can be received in a propagated signal, for example, over the transceiver 1271 or the external interface 1269.

The mobile computing apparatus or device 1200B of FIG. 12B is intended to represent various forms of mobile devices, such as personal digital assistants, cellular telephones, smart-phones, and other similar computing devices. The mobile computing device 1200B may communicate wirelessly through the communication interface 1264, which may include digital signal processing circuitry where necessary. The communication interface 1264 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 1271 using a radio-frequency. In addition, short-range communication may occur, such as using a Bluetooth, WiFi, or other such transceiver (not shown). In addition, a GPS (Global Positioning System) receiver module 1273 may provide additional navigation and location related wireless data to the mobile computing device 1200B, which may be used as appropriate by applications running on the mobile computing device 1200B.

The mobile computing device 1200B may also communicate audibly using an audio codec 1272, which may receive spoken information from a user and convert it to usable digital information. The audio codec 1272 may likewise generate audible sound for a user, such as through a speaker, e.g., in a handset of the mobile computing device 1200B. Such sound may include sound from voice telephone calls, may include recorded sound (e.g., voice messages, music files, etc.) and may also include sound generated by applications operating on the mobile computing device 1200B.

Still referring to FIG. 12B, the mobile computing device 1200B may be implemented in a number of different forms, as shown in the figure. For example, it may be implemented as a cellular telephone 1274. It may also be implemented as part of a smart-phone 1275, personal digital assistant, or other similar mobile device.

EMBODIMENTS

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. An encoder, comprising:
   a scale with a multi-layer reflective/transmissive structure, wherein each layer includes a matrix having rows, such that each row of the matrix corresponds to a pattern used to form a measurement;
   an emitter of a single THz transceiver of the encoder to emit a terahertz (THz) waveform to the scale according to a THz compressed scanning scheme while in relative motion with the scale;
   a receiver of the single THz transceiver of the encoder to measure amplitudes of the THz waveform reflected from rows of each layer of the multi-layer reflective/transmissive structure through the scale;
   a computer hardware memory to store data including patterns corresponding to predetermined positions of the emitter or a set of training amplitudes of reflected/transmitted THz waveforms, based on patterns of the multi-layer reflective/transmissive structure from the scale;
   a processor to determine a position of the emitter from the measurements of the amplitudes received by the receiver based on the stored data; and
   an output interface to render the position of the emitter.

2. The encoder of claim 1, wherein the emitter with a focusing lens and a THz spatial light modulator is directed at a row of the matrix of each layer, such that the emitter emits the THz waveform to the scale via the collimating lens according to the THz compressed scanning scheme, wherein the THz waveform is collimated by the collimating lens and then modulated by the THz spatial light modulator with random patterns, the reflected THz waveform passes through the focusing lens and detected by the receiver of the single THz transceiver.

3. The encoder of claim 1, wherein the emitter emits the THz waveform to the scale according to the THz compressed scanning scheme, with reflected measurements, to decode multi-row patterns of each layer of the multi-layer reflective/transmissive structure of the scale.

4. The encoder of claim 1, wherein the emitter emits the THz waveform to the scale according to the THz compressed scanning scheme with reflected measurements, to decode multi-layer pseudo-random patterns for absolute positioning systems.

5. The encoder of claim 1, wherein the emitter emits the THz waveform to the scale according to the THz compressed scanning scheme, such that the THz compressed scanning scheme uses $l_\infty$ regularized least squared approach to decode the pseudo-random patterns with signal pre-processing steps.

6. The encoder of claim 1, wherein the emitter emits the THz waveform to the scale according to the THz compressed scanning scheme, such that the THz compressed scanning scheme uses a box-constrained optimization approach to decode the pseudo-random patterns with signal pre-processing steps.

7. The encoder of claim 1, wherein the emitter emits the THz waveform to the scale according to the THz compressed scanning scheme, such that the THz compressed scanning scheme uses prior distributions on the reflectance/transmission coefficients of patterns to identify signal features including positiveness and binary/multi-level values, with signal pre-processing steps.

8. The encoder of claim 7, wherein the processor uses a variational Bayesian approach to recover the reflected/transmitted THz waveform or a binary/multi-level reflectance waveform of the scale.

9. The encoder of claim 8, wherein the variational Bayesian approach used in the processor recovers an initial estimate of binary coded patterns by imposing a prior distribution on a solution and iteratively maximizes a posterior distribution likelihood function and a Q-function to update deterministic unknown parameters, so as to recover binary/multi-level patterns of the scale.

10. The encoder of claim 9, wherein the Q-function is of an expectation-maximization (EM) algorithm that is an iterative variational EM algorithm, so as to recover binary/multi-level patterns of the scale.

11. An encoder, comprising:
a scale with a multi-layer reflective/transmissive structure, wherein each layer includes a matrix having rows, such that each row of the matrix corresponds to a pattern used to form a measurement;
an emitter of a single THz transceiver of the encoder to emit a terahertz (THz) waveform to the scale according to a THz compressed scanning scheme while in relative motion with the scale, such that the THz compressed scanning scheme uses prior distributions on reflectance/transmission coefficients of patterns to identify signal features including positiveness and binary/multi-level values, with signal pre-processing steps via a processor of the encoder;
a receiver of the single THz transceiver of the encoder to measure amplitudes of the THz waveform reflected from rows of each layer of the multi-layer reflective/transmissive structure through of the scale;
a computer hardware memory to store data including patterns corresponding to predetermined positions of the emitter or a set of training amplitudes of reflected THz waveforms, based on patterns of the multi-layer reflective/transmissive structure from the scale, wherein the processor determines a position of the emitter from the measurements of the amplitudes received by the receiver, based on the stored data; and
an output interface to render the position of the emitter.

12. The encoder of claim 11, wherein the stored data includes a signal model of the reflected/transmissive waveform from each layer of the reflective/transmissive structure that forms a periodic pattern, such that the processor determines the position of the emitter from the measurements of the amplitudes based on the signal model.

13. The encoder of claim 11, wherein the patterns of each layer of the reflective/transmissive structure from the scale form a non-periodic pattern to encode an absolute position of the emitter, wherein the stored data includes a mapping between sequences of amplitude values and a position of the emitter, such that the mapping is a function of the non-periodic pattern, and wherein the processor maps measurements of the sequences of the amplitudes to the position of the emitter according to the mapping.

14. The encoder of claim 13, wherein each row of the matrix corresponds to a plurality of unit cells, such that the plurality of unit cells corresponds to a pattern, and wherein the data stored in the computer hardware memory include a pattern that defines one or combination of a predetermined position and an orientation of each plurality of unit cells in each row of the matrix.

15. The encoder of claim 14, wherein the position of the unit cell defines at least one bit of data of the pattern.

16. An absolute positioning encoder method for an encoder, the method comprising:
emitting by an emitter of a single THz transceiver of the encoder a Terahertz (THz) waveform of the encoder according to a THz compressed scanning scheme while in relative motion with the scale, to a scale with a multi-layer reflective/transmissive structure, wherein each layer of the multi-layer reflective/transmissive structure includes a matrix having rows, such that each row of the matrix corresponds to a pattern used to form a measurement, wherein the THz compressed scanning scheme uses prior distributions on the reflectance/transmission coefficients of patterns to identify signal features including positiveness and binary/multi-level values, with signal pre-processing steps via a processor of the encoder, and the processor uses a variational Bayesian approach to recover the reflected/transmitted THz waveform or a binary/multi-level reflectance waveform of the scale;
measuring by a receiver of the single THz transceiver of the encoder, amplitudes of the THz waveform reflected from rows of each layer of the multi-layer reflective/transmissive structure of the scale;
retrieving from a computer hardware memory of the encoder, stored data including patterns corresponding to predetermined positions of the emitter or a set of training amplitudes of THz waveforms, based on patterns on the multi-layer reflective/transmissive structure of the scale;
determining by the processor, a position of the emitter from the measurements of the amplitudes received by the receiver, based on the stored data; and
rendering the position of the emitter to an output interface.

17. An absolute positioning encoder system including an encoder including an array of THz transceivers, the encoder having a scale with a multi-layer reflective/transmissive structure, wherein each layer includes a matrix having rows, such that each row of the matrix corresponds to a pattern used to form a measurement, the system comprising:
an emitter for each THz transceiver of the array of THz transceivers of the encoder emits a terahertz (THz) waveform to the scale according to a line scanning scheme, wherein each emitter is aligned with a single row of each layer of the multi-layer reflective/transmissive structure, and emits the THz waveform to the scale, while in relative motion with the scale, wherein the line scanning scheme uses prior distributions on the reflectance/transmission coefficients of patterns to identify signal features including positiveness and binary/multi-level values, with signal pre-processing steps via a processor of the encoder, and the processor uses a variational Bayesian approach to recover the reflected/transmitted THz waveform or a binary/multi-level reflectance waveform of the scale;

a receiver for each THz transceiver of the array of THz transceivers of the encoder measures amplitudes of the THz waveform reflected from some rows of each layer of the multi-layer reflective/transmissive structure of the scale;

a computer hardware memory of the encoder to store data including patterns corresponding to predetermined positions of the emitter or a set of training amplitudes of reflected THz waveforms, based on patterns of the layers of the multi-layer reflective/transmissive structure from the scale, wherein the processor is to determine a position of the emitter from the measurements of the amplitudes based on the stored data; and an output interface to render the position of the emitter.

18. The absolute positioning encoder system of claim 17, wherein each emitter emits the THz waveform to the line scanning scheme having the array of THz transceivers with reflected measurements, to decode multi-row patterns of each layer of the multi-layer reflective/transmissive structure of the scale.

19. The absolute positioning encoder system of claim 18, wherein the variational Bayesian approach used in the processor recovers an initial estimate of binary coded patterns by imposing a prior distribution on a solution and iteratively maximizes a posterior distribution likelihood function and a Q-function to update deterministic unknown parameters, so as to recover binary/multi-level patterns of the scale.

* * * * *